United States Patent
Bhojwani et al.

(10) Patent No.: US 10,558,945 B2
(45) Date of Patent: Feb. 11, 2020

(54) MASTER DATA MANAGEMENT FOR A CLOUD COMPUTING SYSTEM

(71) Applicant: SAP SE, Walldorf (DE)

(72) Inventors: Sudhir Bhojwani, Mountain View, CA (US); Lalitha Rajagopalan, Palo Alto, CA (US); Anil Mandava, Saratoga, CA (US); Robert Wells, Shoreline, WA (US); Tanvi Bakul Shah, Sunnyvale, CA (US); Maria Elena Gammon, McKinney, TX (US); Prashant Bhagat, Cupertino, CA (US); Steven Weigand, Fresno, CA (US); Yuan Tung, Fremont, CA (US)

(73) Assignee: SAP SE, Walldorf (DE)

( * ) Notice: Subject to any disclaimer, the term of this patent is extended or adjusted under 35 U.S.C. 154(b) by 569 days.

(21) Appl. No.: 15/336,796

(22) Filed: Oct. 28, 2016

(65) Prior Publication Data

US 2017/0262493 A1    Sep. 14, 2017

Related U.S. Application Data

(60) Provisional application No. 62/307,336, filed on Mar. 11, 2016.

(51) Int. Cl.
| | | |
|---|---|---|
| *G06F 16/20* | (2019.01) | |
| *G06Q 10/08* | (2012.01) | |
| *G06Q 30/04* | (2012.01) | |
| *G06F 16/27* | (2019.01) | |
| *G06F 16/95* | (2019.01) | |
| *G06F 16/22* | (2019.01) | |
| *G06F 16/248* | (2019.01) | |
| *G06F 16/23* | (2019.01) | |
| *G06F 16/2455* | (2019.01) | |

(52) U.S. Cl.
CPC ....... *G06Q 10/0875* (2013.01); *G06F 16/221* (2019.01); *G06F 16/2379* (2019.01); *G06F 16/248* (2019.01); *G06F 16/2455* (2019.01); *G06F 16/27* (2019.01); *G06F 16/95* (2019.01); *G06Q 30/04* (2013.01)

(58) Field of Classification Search
None
See application file for complete search history.

(56) References Cited

U.S. PATENT DOCUMENTS

| | | | | |
|---|---|---|---|---|
| 8,438,238 B2 * | 5/2013 | Moser | ................ | G06F 16/254 709/217 |
| 2012/0084257 A1 * | 4/2012 | Bansode | ............... | G06F 16/219 707/638 |

* cited by examiner

*Primary Examiner* — Belix M Ortiz Ditren
(74) *Attorney, Agent, or Firm* — Fountainhead Law Group P.C.

(57) ABSTRACT

Some embodiments provide a program that receives, from a first system, a copy of master data. The program also receives a master data modification rule. The program further receives, from a second system, a first request to modify a value of a second field of data in the second system with a new value. In response to the first request, the program also identifies the master data modification rule. The program further performs a set of validation operations specified in the master data modification rule. Based on the performance of the set of validation operation, the program also modifies the first field in the copy of the master data with the new value based on the supplier identifier and sends a second request to the first system to modify the first field in the master data managed by the first system.

20 Claims, 26 Drawing Sheets

| Category \ Location | World 405 | North America 410 | South America 415 | USA 420 | Canada 425 | Brazil 430 | Columbia 435 | California 440 | Nevada 445 | San Francisco 450 | Los Angeles 455 | Las Vegas 460 |
|---|---|---|---|---|---|---|---|---|---|---|---|---|
| IT 465 | S1 | | | | | | | | | | | |
| IT Service 470 | | S2 | | | | | | | | | | |
| IT Equipment 475 | | | | | | | | | | | | |
| Network Security 480 | S5 | | | S4 | | | | | | | | |
| Laptop 485 | | | | | | | | | | | | |
| Desktop 490 | | | | | | | | | S3 | | | |
| Printer 495 | | | | | | | | | | | | |

FIG. 4

| Category \ Location | World 405 | North America 410 | South America 415 | USA 420 | Canada 425 | Brazil 430 | Columbia 435 | California 440 | Nevada 445 | San Francisco 450 | Los Angeles 455 | Las Vegas 460 |
|---|---|---|---|---|---|---|---|---|---|---|---|---|
| IT 465 | S1 | | | | | | | | | | | |
| IT Service 470 | | S2 | | | | | | | | | | |
| IT Equipment 475 | | | | | | | | | | | | |
| Network Security 480 | S5 | | | | | | | | | | | |
| Laptop 485 | | | | S4 | | | | S3 | | | | |
| Desktop 490 | | | | | | | | | | | | |
| Printer 495 | | | | | | | | | | | | |

| Category \ Location | World | North America | South America | USA | Canada | Brazil | Columbia | California | Nevada | San Francisco | Los Angeles | Las Vegas |
|---|---|---|---|---|---|---|---|---|---|---|---|---|
| IT | S1 | | | | | | | | | | | |
| IT Service | | | | | | | | | | | | |
| IT Equipment | | S2 | | | | | | | | | | |
| Network Security | S5 | | | | | | | | | | | |
| Laptop | | | | | | | | | | | | |
| Desktop | | | | | | | | S3 | | | | |
| Printer | | | | | | | | | | | | |

FIG. 8B

| Category \ Location | World 405 | North America 410 | South America 415 | USA 420 | Canada 425 | Brazil 430 | Columbia 435 | California 440 | Nevada 445 | San Francisco 450 | Los Angeles 455 | Las Vegas 460 |
|---|---|---|---|---|---|---|---|---|---|---|---|---|
| IT 465 | S1 | | | | | | | | | | | |
| IT Service 470 | | S2 | | | | | | | | | | |
| IT Equipment 475 | | | | | | | | | | | | |
| Network Security 480 | S5 | | | | | | | | | | | |
| Laptop 485 | | | | S4 | | | | | | | | |
| Desktop 490 | | | | | | | | S3 | | | | |
| Printer 495 | | | | | | | | | | | | |

FIG. 8D

| Category \ Location | World | North America | South America | USA | Canada | Brazil | Columbia | California | Nevada | San Francisco | Los Angeles | Las Vegas |
|---|---|---|---|---|---|---|---|---|---|---|---|---|
| IT | S1 | | | | | | | | | | | |
| IT Service | | | | | | | | | | | | |
| IT Equipment | S2 | | | | | | | | | | | |
| Network Security | S5 | | | | | | | | | | | |
| Laptop | | | | S4 | | | | S3 | | | | |
| Desktop | | | | | | | | | | | | |
| Printer | | | | | | | | | | | | |

FIG. 8E

| Category \ Location | World | North America | South America | USA | Canada | Brazil | Columbia | California | Nevada | San Francisco | Los Angeles | Las Vegas |
|---|---|---|---|---|---|---|---|---|---|---|---|---|
| IT | S1 | | | | | | | | | | | |
| IT Service | | | | | | | | | | | | |
| IT Equipment | S2 | | | | | | | | | | | |
| Network Security | S5 | | | | | | | | | | | |
| Laptop | | | | S4 | | | | | | | | |
| Desktop | | | | | | | | S3 | | | | |
| Printer | | | | | | | | | | | | |

FIG. 8F

| Category \ Location | World 905 | North America 910 | South America 915 | USA 920 | Canada 925 | Brazil 930 | Columbia 935 | California 940 | Nevada 945 | San Francisco 950 | Los Angeles 955 | Las Vegas 960 |
|---|---|---|---|---|---|---|---|---|---|---|---|---|
| IT 965 | | | | | | QS1 | | | | | | |
| IT Service 970 | QS2 | QS2 | QS2 | QS2 | QS2 | QS1 QS2 | QS2 | QS2 | QS2 | QS2 | QS2 | QS2 |
| IT Equipment 975 | | | | | | QS1 | | | | | | |
| Network Security 980 | | | | | | QS1 | | QS3 | | | | |
| Laptop 985 | | | | | | QS1 | | | | | | |
| Desktop 990 | | | | | | QS1 | | | | | | |
| Printer 995 | | | | QS4 | | QS1 | | | | | | |

FIG. 9

| Category \ Location | World 905 | North America 910 | South America 915 | USA 920 | Canada 925 | Brazil 930 | Columbia 935 | California 940 | Nevada 945 | San Francisco 950 | Los Angeles 955 | Las Vegas 960 |
|---|---|---|---|---|---|---|---|---|---|---|---|---|
| IT 965 | | | | | | QS1 | | | | | | |
| IT Service 970 | QS2 | QS2 | QS2 | QS2 | QS2 | QS1 QS2 | QS2 | QS2 | QS2 | QS2 | QS2 | QS2 |
| IT Equipment 975 | | | | | | QS1 | | | | | | |
| Network Security 980 | | | | | | QS1 | | QS3 | | | | |
| Laptop 985 | | | | | | QS1 | | | | | | |
| Desktop 990 | | | | | | QS1 | | | | | | |
| Printer 995 | | | | QS4 | | QS1 | | | | | | |

FIG. 13A

| Category \ Location | World 905 | North America 910 | South America 915 | USA 920 | Canada 925 | Brazil 930 | Columbia 935 | California 940 | Nevada 945 | San Francisco 950 | Los Angeles 955 | Las Vegas 960 |
|---|---|---|---|---|---|---|---|---|---|---|---|---|
| IT 965 | | | | | | QS1 | | | | | | |
| IT Service 970 | QS2 | QS2 | QS2 | QS2 | QS2 | QS1 QS2 | QS2 | QS2 | QS2 | QS2 | QS2 | QS2 |
| IT Equipment 975 | | | | | | QS1 | | | | | | |
| Network Security 980 | | | | | | QS1 | | QS3 | | | | |
| Laptop 985 | | | | | | QS1 | | | | | | |
| Desktop 990 | | | | | | QS1 | | | | | | |
| Printer 995 | | | | QS4 | | QS1 | | | | | | |

FIG. 13B

| Category \ Location | World 905 | North America 910 | South America 915 | USA 920 | Canada 925 | Brazil 930 | Columbia 935 | California 940 | Nevada 945 | San Francisco 950 | Los Angeles 955 | Las Vegas 960 |
|---|---|---|---|---|---|---|---|---|---|---|---|---|
| IT 965 | | | | | | QS1 | | | | | | |
| IT Service 970 | QS2 | QS2 | QS2 | QS2 | QS2 | QS1 QS2 | QS2 | QS2 | QS2 | QS2 | QS2 | QS2 |
| IT Equipment 975 | | | | | | QS1 | | | | | | |
| Network Security 980 | | | | | | QS1 | | QS3 | | | | |
| Laptop 985 | | | | | | QS1 | | | | | | |
| Desktop 990 | | | | | | QS1 | | | | | | |
| Printer 995 | | | | QS4 | | QS1 | | | | | | |

FIG. 13D

| Category \ Location | 905 World | 910 North America | 915 South America | 920 USA | 925 Canada | 930 Brazil | 935 Columbia | 940 California | 945 Nevada | 950 San Francisco | 955 Los Angeles | 960 Las Vegas |
|---|---|---|---|---|---|---|---|---|---|---|---|---|
| 965 IT | | | | | | QS1 | | | | | | |
| 970 IT Service | QS2 | QS2 | QS2 | QS2 | QS2 | QS1 QS2 | QS2 | QS2 | QS2 | QS2 | QS2 | QS2 |
| 975 IT Equipment | | | | | | QS1 | | | | | | |
| 980 Network Security | | | | | | QS1 | | QS3 | | | | |
| 985 Laptop | | | | | | QS1 | | | | | | |
| 990 Desktop | | | | | | QS1 | | | | | | |
| 995 Printer | | | | QS4 | | QS1 | | | | | | |

FIG. 13F

MASTER DATA MANAGEMENT FOR A CLOUD COMPUTING SYSTEM

CROSS-REFERENCE TO RELATED APPLICATION

The present application claims the benefit and priority of U.S. Provisional Application No. 62/307,336, filed Mar. 11, 2016, entitled "Supplier Management," the entire contents of which are incorporated herein by reference in its entirety for all purposes.

BACKGROUND

A large number of computing devices used today has led to an even larger amount of data created, stored, and accessed by computing devices. A great deal of the data is useful to many other computing devices. Thus, systems may be used to manage and share data with other computing systems and/or computing devices. For example, an enterprise may have systems that manage and store a collection data that is used across multiple systems, applications, and/or processes associated with the enterprise. In many instances, data is added to or removed from the collection of data. Edits may also be made to existing data in the collection of data. As such, the systems need to ensure that the collection of data used by the systems, applications, and/or processes in the enterprise is correct.

SUMMARY

In some embodiments, a non-transitory machine-readable medium stores a program executable by at least one processing unit of a device. The program receives, from a first system, a copy of master data, the master data comprising data associated with a plurality of suppliers. The master data is managed by the first system. The program also receives a master data modification rule comprising a supplier identifier associated with a supplier in the plurality of suppliers, a mapping between a first field of data in the master data and a second field of data in a second system, and a set of validation operations to perform in response to requests to modify the second field. The program further receives, from the second system, a first request to modify a value of the second field of the data in the second system with a new value. In response to the first request, the program also identifies the master data modification rule. The program further performs the set of validation operations specified in the master data modification rule. Based on the performance of the set of validation operation, the program also modifies the first field in the copy of the master data with the new value based on the supplier identifier and sends a second request to the first system to modify the first field in the master data managed by the first system.

In some embodiments, the set of validation operations includes sending a third request to a user of the first system for approval to modify the first field of data in the master data with the new value. The program may further receive approval from the user of the first system in response to the third request. In some embodiments, the set of validation operations includes sending a third request to a third system to validate the new value. The program may further receive a response from the third system indicating the new value is valid.

In some embodiments, the master data is a first master data, the plurality of suppliers is a first plurality of suppliers, the master data modification rule is a first master data modification rule, the supplier identifier is a first supplier identifier, the mapping is a first mapping, and the set of validation operations is a first set of validation operations. The program may further receive, from a third system, a copy of a second master data, the second master data comprising data associated with a second plurality of suppliers. The second master data may be managed by the third system. The program may also receive a second master data modification rule comprising a second supplier identifier associated with a supplier in the second plurality of suppliers, a second mapping between a third field of data in the master data and a fourth field of data in the second system, and a second set of validation operations to perform in response to requests to modify the fourth field.

In some embodiments, the new value is a first new value. In response to the first request, the program may further identify the second master data modification rule. The program may also perform the second set of validation operations specified in the second master data modification rule. Based on the performance of the second set of validation operations, the program may further modify the third field in the copy of the second master data with the second new value based on the second supplier identifier and send a fourth request to the second system to modify the third field in the second master data managed by the second system.

In some embodiments, the new value is a first new value. The program may further receive, from the second system, a third request to modify a value of the fourth field of the data in the second system with a second new value. In response to the third request, the program may also identify the second master data modification rule. The program may further perform the second set of validation operations specified in the second master data modification rule. Based on the performance of the second set of validation operations, the program may also modify the third field in the copy of the second master data with the second new value based on the second supplier identifier and send a fourth request to the second system to modify the third field in the second master data managed by the second system.

In some embodiments, the program further sends a notification to the second system that the modification has been applied to the first field of the master data so that the second system can apply the modification to the second field of data in the second system.

In some embodiments, a method receives, from a first system, a copy of master data, the master data comprising data associated with a plurality of suppliers. The master data is managed by the first system. The method also receives a master data modification rule comprising a supplier identifier associated with a supplier in the plurality of suppliers, a mapping between a first field of data in the master data and a second field of data in a second system, and a set of validation operations to perform in response to requests to modify the second field. The method further receives, from the second system, a first request to modify a value of the second field of the data in the second system with a new value. In response to the first request, the method also identifies the master data modification rule. The method further performs the set of validation operations specified in the master data modification rule. Based on the performance of the set of validation operations, the method also modifies the first field in the copy of the master data with the new value based on the supplier identifier and sends a second request to the first system to modify the first field in the master data managed by the first system.

In some embodiments, the set of validation operations includes sending a third request to a user of the first system for approval to modify the first field of data in the master data with the new value. The method may further receive approval from the user of the first system in response to the third request. In some embodiments, the set of validation operations includes sending a third request to a third system to validate the new value. The method may further receive a response from the third system indicating the new value is valid.

In some embodiments, the master data is a first master data, the plurality of suppliers is a first plurality of suppliers, the master data modification rule is a first master data modification rule, the supplier identifier is a first supplier identifier, the mapping is a first mapping, and the set of validation operations is a first set of validation operations. The method may further receive, from a third system, a copy of a second master data, the second master data comprising data associated with a second plurality of suppliers. The second master data may be managed by the third system. the method may also receive a second master data modification rule comprising a second supplier identifier associated with a supplier in the second plurality of suppliers, a second mapping between a third field of data in the master data and a fourth field of data in the second system, and a second set of validation operations to perform in response to requests to modify the fourth field.

In some embodiments, the new value is a first new value. In response to the first request, the method may further identify the second master data modification rule. The method may also perform the second set of validation operations specified in the second master data modification rule. Based on the performance of the second set of validation operations, the method may further modify the third field in the copy of the second master data with the second new value based on the second supplier identifier and send a fourth request to the second system to modify the third field in the second master data managed by the second system.

In some embodiments, the new value is a first new value. The method may further receive, from the second system, a third request to modify a value of the fourth field of the data in the second system with a second new value. In response to the third request, the method may also identify the second master data modification rule. The method may further perform the second set of validation operations specified in the second master data modification rule. Based on the performance of the second set of validation operations, the method may also modify the third field in the copy of the second master data with the second new value based on the second supplier identifier and send a fourth request to the second system to modify the third field in the second master data managed by the second system.

In some embodiments, the method further sends a notification to the second system that the modification has been applied to the first field of the master data so that the second system can apply the modification to the second field of data in the second system.

In some embodiments, a system includes a set of processing units and a non-transitory computer-readable medium storing instructions. The instructions cause at least one processing unit to receive, from a first system, a copy of master data, the master data comprising data associated with a plurality of suppliers. The master data is managed by the first system. The instructions further cause the at least one processing unit to receive a master data modification rule comprising a supplier identifier associated with a supplier in the plurality of suppliers, a mapping between a first field of data in the master data and a second field of data in a second system, and a set of validation operations to perform in response to requests to modify the second field. The instructions also cause the at least one processing unit to receive, from the second system, a first request to modify a value of the second field of the data in the second system with a new value. In response to the first request, identify the master data modification rule, the instructions further cause the at least one processing unit to perform the set of validation operations specified in the master data modification rule. Based on the performance of the set of validation operations, the instructions also cause the at least one processing unit to modify the first field in the copy of the master data with the new value based on the supplier identifier and send a second request to the first system to modify the first field in the master data managed by the first system.

In some embodiments, the set of validation operations includes sending a third request to a user of the first system for approval to modify the first field of data in the master data with the new value. The instructions may further cause the at least one processing unit to receive approval from the user of the first system in response to the third request. In some embodiments, the set of validation operations includes sending a third request to a third system to validate the new value. The instructions may further cause the at least one processing unit to receive a response from the third system indicating the new value is valid.

In some embodiments, the master data is a first master data, the plurality of suppliers is a first plurality of suppliers, the master data modification rule is a first master data modification rule, the supplier identifier is a first supplier identifier, the mapping is a first mapping, and the set of validation operations is a first set of validation operations. The instructions may further cause the at least one processing unit to: receive, from a third system, a copy of a second master data, the second master data comprising data associated with a second plurality of suppliers. The second master data is managed by the third system. The instructions may also cause the at least one processing unit to receive a second master data modification rule comprising a second supplier identifier associated with a supplier in the second plurality of suppliers, a second mapping between a third field of data in the master data and a fourth field of data in the second system, and a second set of validation operations to perform in response to requests to modify the fourth field.

In some embodiments, the new value is a first new value. In response to the first request, the instructions may further cause the at least one processing unit to identify the second master data modification rule. The instructions may also cause the at least one processing unit to perform the second set of validation operations specified in the second master data modification rule. Based on the performance of the second set of validation operations, the instructions may further cause the at least one processing unit to modify the third field in the copy of the second master data with the second new value based on the second supplier identifier and send a fourth request to the second system to modify the third field in the second master data managed by the second system.

In some embodiments, the new value is a first new value. The instructions may further cause the at least one processing unit to receive, from the second system, a third request to modify a value of the fourth field of the data in the second system with a second new value. In response to the third request, the instructions may also cause the at least one processing unit to identify the second master data modification rule. The instructions may further cause the at least one processing unit to perform the second set of validation operations specified in the second master data modification rule. Based on the performance of the second set of validation operations, the instructions also cause the at least one processing unit to modify the third field in the copy of the second master data with the second new value based on the second supplier identifier and send a fourth request to the second system to modify the third field in the second master data managed by the second system.

The following detailed description and accompanying drawings provide a better understanding of the nature and advantages of the present invention.

BRIEF DESCRIPTION OF THE DRAWINGS

FIG. 4 illustrates an example two-dimensional matrix used to organize suppliers according to some embodiments.

FIGS. 8A-8F illustrate an example traversal through the matrix illustrated in FIG. 4 based on the hierarchies illustrated in FIGS. 5 and 6 according to some embodiments.

FIG. 9 illustrates an example two-dimensional matrix used to organize sets of questions according to some embodiments.

FIGS. 13A-13F illustrate an example traversal through the matrix illustrated in FIG. 9 based on the hierarchies illustrated in FIGS. 10 and 11 according to some embodiments.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for managing master data. In some embodiments, a system is provide that manages modification to master data of other systems. Such a system may store copies of the master data of the other systems and synchronizes the copies of the master data with the master data stored in the other systems. The system may receive requests from suppliers to modify data in the master data associated with the supplier. In some embodiments, the system employs rules to determine operations to validate the modification.

In some embodiments, the system organizes suppliers according to locations and categories associated with the suppliers. For example, the system may use a matrix and defined hierarchies to manage and identify suppliers based on the locations and categories associated with the suppliers. The system may manage processes for qualifying candidate suppliers that includes sending questions to the candidate suppliers. In some embodiments, the system dynamically generates an aggregate collection of questions from different defined sets of questions based on a location and category for which the candidate supplier is requested to be qualified.

Figure 1:
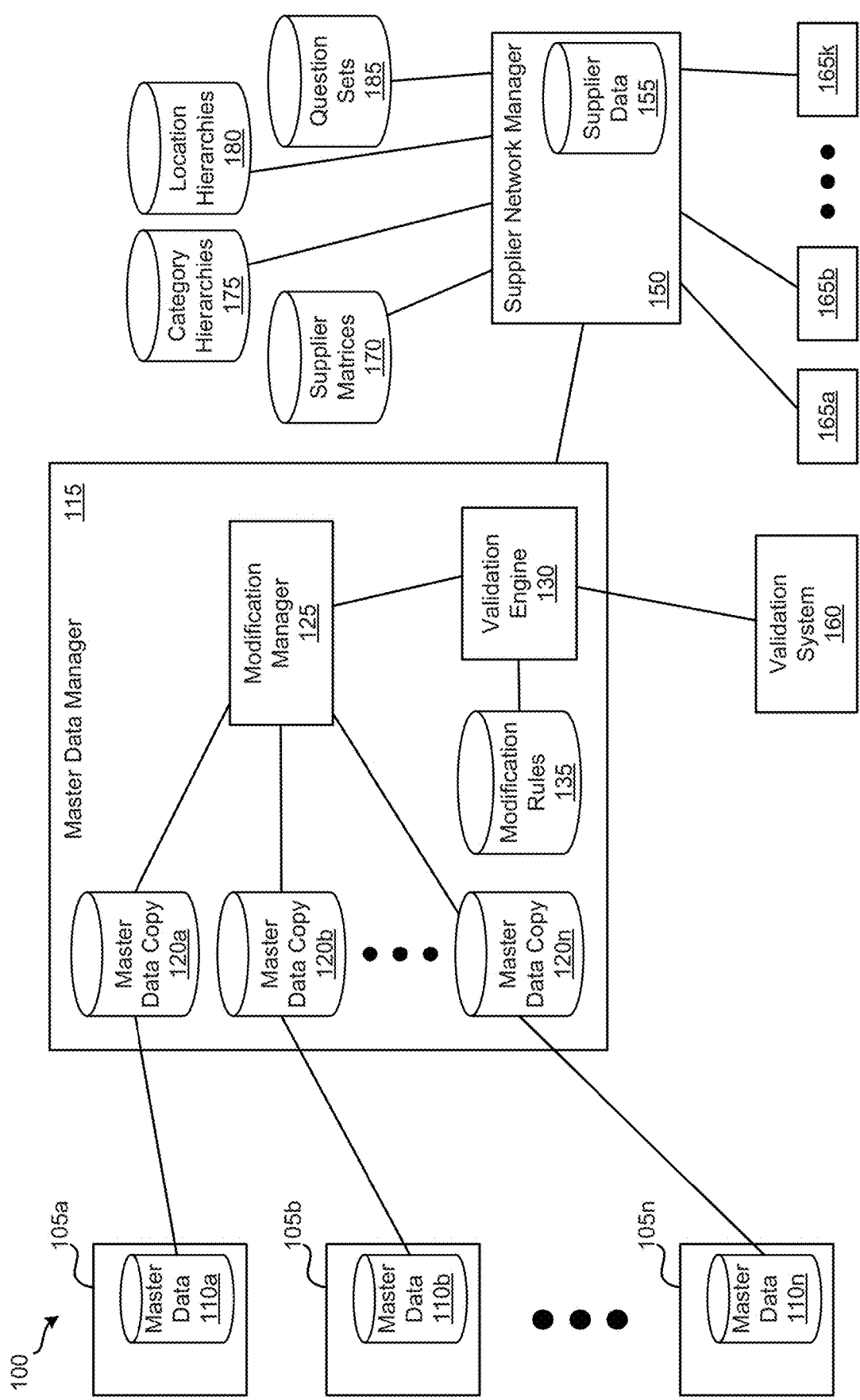
FIG. 1 illustrates a system for managing master data according to some embodiments.

FIG. 1 illustrates a system 100 for managing master data according to some embodiments. As shown, system 100 includes computing systems 105a-n, master data manager 115, supplier network manager 150, validation system 160, client devices 165a-k, and storages 170-185. As illustrated in FIG. 1, each computing system 105 includes a master data storage 110 that is managed by the corresponding computing system 105. Each master data storage 110 is configured to store master data. Each computing system 105 is configured to synchronize master data stored in a master data storage 110 managed by the computing system 105 with a copy of the master data managed by master data manager 115. If master data manager 115 does not have a copy of the master data, computing system 105 sends master data manager 115 a copy of the master data.

In some embodiments, master data includes data associated with the computing system 105 that manages the master data. Master data may also include data associated with other systems. For example, master data includes data associated with one or more suppliers with which computing system 105 participates in transactions. Such data may be referred to as supplier master data or vendor master data. In some embodiments, supplier master data includes, for a particular supplier, legal information (e.g., supplier name, address, contact information, tax identifier (ID), etc.), financial information (e.g., bank details, payment terms, etc.), procurement information (e.g., a location at which orders are received, a method of ordering, an address for ordering, an address for invoicing, etc.), line of business information (e.g., information associated with manufacturing, information associated with retail, etc.), etc. Each master data storage 110 may store supplier master data associated with any number of different suppliers. Different master data storages 110 may store supplier master data associated with the same, similar, and/or different suppliers.

Supplier network manager 150 manages a platform that facilitates transactions between users of computing systems 105a-n (e.g., buyers) and users of client devices 165a-k (e.g., suppliers or vendors). In some embodiments, supplier network manager 150 provides an interface (e.g., a web portal) through which users of client devices 165a-k manage and store information associated with suppliers (e.g., supplier information), items (e.g., goods and/or services) the suppliers are offering for sale to users of computing systems 105a-n, purchases of items, invoicing for the purchases, request for quotes (RFQs) for items, etc. In some embodiments, supplier network manager 150 and master data manager 115 are implemented on the same computing system (e.g., a cloud computing system). In other embodiments, supplier network manager 150 and master data manager 115 are implemented on separate systems.

As shown, supplier network manager 150 includes supplier data storage 155, which is configured to store data associated with suppliers (also referred to as supplier data). The information stored in supplier data storage 155 includes the same or similar data as supplier master data stored in master data storages 110a-n. For example, supplier data storage 155 may include, for a particular supplier, legal information (e.g., supplier name, address, contact information, tax ID, etc.), financial information (e.g., bank details, payment terms, etc.), procurement information (e.g., a location at which orders are received, a method of ordering, an address for ordering, an address for invoicing, etc.), etc.

In some embodiments, the fields for storing data in supplier data storage 155 are different than the fields for storing the same or similar data in master data storages 110a-n. For instance, a bank account number and a routing number may be stored in supplier data storage 155 in the fields "account number" and "routing number" while a bank account number and a routing number may be stored in a master data storage 110 in the fields "bank details 1" and "bank details 2." Furthermore, different computing systems 105a-n may store the same or similar supplier data in master data storages 110a-n using different fields in some embodiments. Continuing with the example, different computing systems 105a-n may store a bank account number and a routing number in master data storages 110a-n using different fields.

Client devices 165a-k are configured to access and communicate with supplier network manager 150. For instance, a user (e.g., an employee of a supplier, etc.) may use a client device 165 to access and manage, through the interface provided by supplier manager network 150, information associated with the supplier, items (e.g., goods and/or services) the supplier is offering for sale to users of computing systems 105a-n, purchases of items, invoicing for the purchases, request for quotes (RFQs) for items, etc.

Master data manager 115 is responsible for managing master data that is synchronized with master data stored in computing systems 105a-n. As shown in FIG. 1, master data manager 115 includes master data storage copies 120a-n, modification manager 125, validation engine 130, and modification rule storage 135. Master data storage copy 120a-n are copies of master data stored in the corresponding master data storages 110a-n of computing systems 105a-n. If master data manager 115 does not have a copy of master data from a particular computing system 105, master data manager 115 sends the particular computing system 105 a request for a copy of the master data. Upon receiving the copy of master data, master data manager 115 stores the copy in a corresponding master data storage copy 120 and synchronizes the master data stored in the master data storage copy 120 with the master data stored in the corresponding master data storage 110.

Master data manager 115 may receive requests from supplier network manager 150 to modify data in master data. In response to such requests, master data manager 115 sends the request to modification manager 125 for processing. In some instances, master data manager 115 may receive notifications from modification manager 125 of modifications to master data copy storages 120a-n. In response to such notifications, master data manager 115 sends notifications to corresponding computing systems 110 to update the respective master data storages 110 and notifications to supplier network manager 150 that requested modifications to the master data have been applied. In other instances, master data manager 115 may receive notifications from modification manager 125 that a request to modify master data is not valid. In response to these notifications, master data manager 115 sends notifications to supplier network manager 150 indicating that the request to modify master is denied.

Modification manager 125 handles requests to modify master data. When modification manager 125 receives a requests from master data manager 115 to process a request to modify master data, modification manager 125 forwards the request to, and instructs, validation engine 130 to validate the modification request. If validation engine 130 informs modification manager 125 that the new value is valid, modification manager 125 modifies master data in one or more master data copy storages 120a-n and notifies master data manager 115 of the modifications. Otherwise, modification manager 125 notifies master data manager 115 that the new value is not valid.

As mentioned above, in some embodiments, different computing systems 105a-n may store the same or similar supplier data in master data storages 110a-n using different fields. In some embodiments, master data modification rules are used to process requests to modify data in master data storages 110a-n. In some embodiments, a master data modification rule includes a supplier identifier (ID) associated with a particular supplier; a mapping between a field in the master data stored in a master data storage 110 and a field of supplier data stored in supplier data storage 155 associated with the particular supplier; and a set of validation operations that are performed when a modification to the field in the supplier data is requested.

In some embodiments, users of computing systems 105a-n create modification rules and send the modification rules to master data manager 115 to store in modification rule storage 135. For example, master data manager 115 may provide a form (e.g., via a graphical user interface (GUI)) for creating a master data modification rule to a user of a computing system 105. The form includes the fields of supplier data. The user may select a supplier/supplier ID and a field in the master data that corresponds to a field of the supplier data. Using the example described above, the master data stored in a master data storage 110 may use a field "bank details 1" to store a bank account number of a supplier while supplier data uses a field "account number" to store its band account number. The user in such an example selects the field "account number" from the fields of the supplier data to map to the "bank details 1" field of the master data. Next, the user may specify a set of validation operations that are performed when the "account number" field in the supplier data is requested to be modified. Once the user has created the master data validation rule, computing system 105 sends the master data modification rule to master data manager 115 for storage. In some embodiments, the set of validation operations includes a sending a request to validation system 160 to validate the modification. In other embodiments, the set of validation operations includes requesting a user of computing system 105 to provide approval for the modification.

Validation engine 130 is responsible for processing requests to validate modifications to master data. For instance, validation engine 130 may receive a request from modification manager 125 to validate a request to modify master data stored in a master data storage 110. The request specifies a new value for a field in supplier data associated with a particular supplier. Validation engine 130 then accesses modification rule storage 135 to identify one or more master data validation rules that includes a mapping that specifies the particular field of supplier data associated with the particular supplier. For each identified master data validation rule, validation engine 130 executes the set of validation operations specified in the master data validation rule. If the new value is a valid value based on the result of the set of validation operations of a particular master data modification rule, validation engine 130 identifies a master data storage based on the mapping of the master data modification rule and sends modification manager 125 a request to modify the field in the identified master data storage, the supplier ID specified in the master data modification rule, and the new value. Otherwise, validation engine 130 informs modification manager 125 that the new value is not a valid value.

Validation system 160 is configured to provide automated validation to modifications to master data stored in master data storage 110a-n. Validation system 160 may receive a request from validation engine 130 to validate a new value for a particular field in a master data storage 110a-n. In some embodiments, the request also includes data associated with the supplier with which the particular field is associated. For example, if validation system 160 receives a request to validate a new bank account number for a supplier, such a request may include the name of the supplier, the address of the supplier, the tax identifier of the supplier, etc. Validation system 160 determines whether the new value requested for the particular field is a valid value based on the data associated with the supplier that is included in the request. Validation system 160 then sends validation engine 130 a notification of the result of the determination (e.g., the new value is a valid value or the new value is not a valid value). In some embodiments, validation system 160 is a system (e.g., a third party system) separate from a system on which master data manager 115 is implemented. In other embodiments, validation system 160 and master data manager 115 are implemented on the same system.

Figure 2:
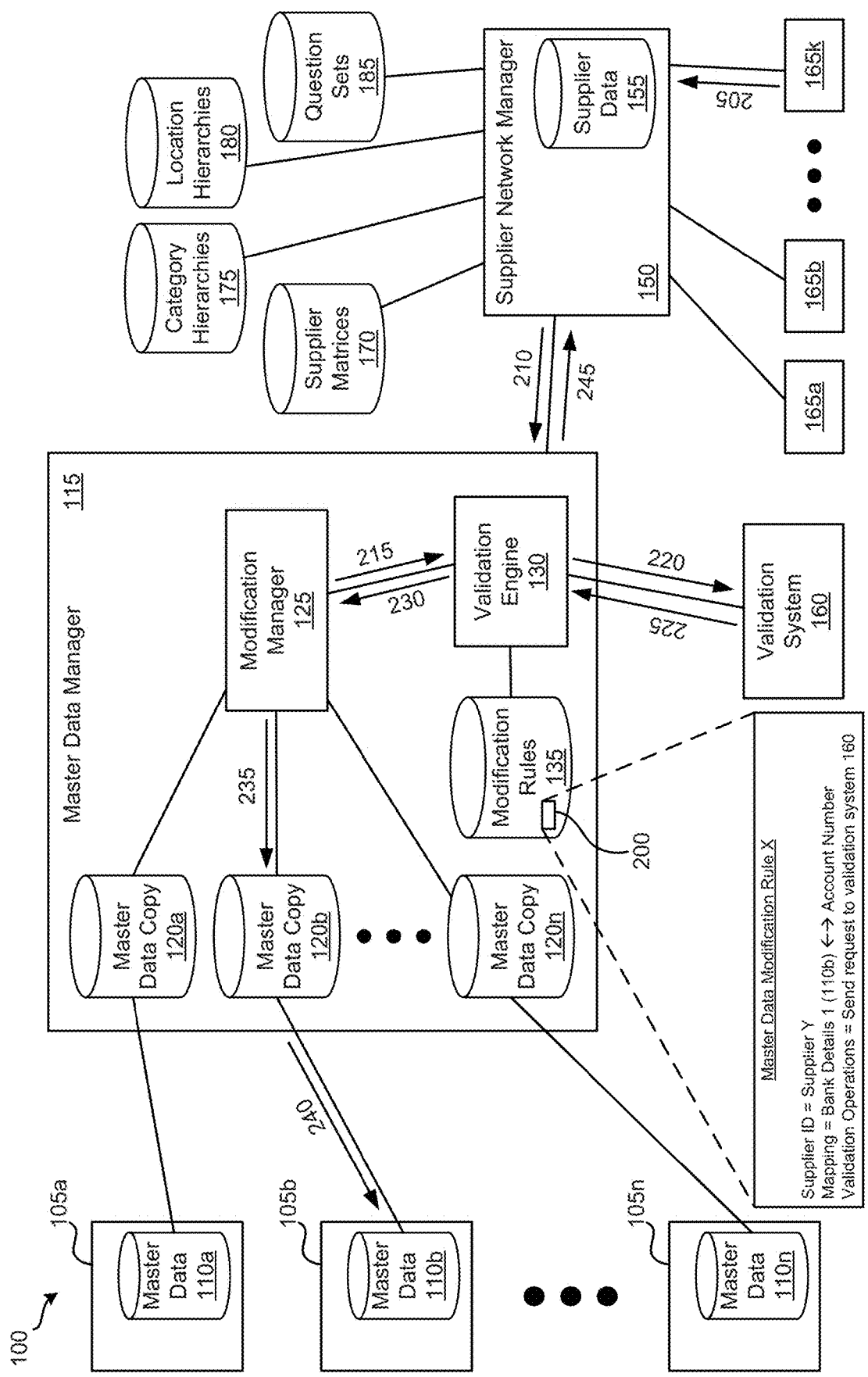
FIG. 2 illustrates an example data flow through the system illustrated in FIG. 1 according to some embodiments.

FIG. 2 illustrates an example data flow through the system illustrated in FIG. 1 according to some embodiments. Specifically, FIG. 2 illustrates a data flow of a user of a client device requesting modification to a field of supplier data associated with a particular supplier. The data flow starts by a user of client device 165k sending, at operation 205, supplier network manager 150 a request to modify a field of supplier data associated with a particular supplier. In this example, the request is to modify a "bank account" field of supplier data associated with the particular supplier with a new bank account number. In some embodiments, the user of client device 165k sends the request through a GUI provided by supplier network manager 150 that the user of client device 165k uses to access and manager supplier data associated with the supplier.

When supplier network manager 150 receives the request, supplier network manager 150 forwards, at operation 210, the request to master data manager 115. Upon receiving the request from supplier network manager 150, master data manager 115 accesses sends the request to modification manager 125 for processing. After receiving the request from master data manager 115, modification manager 125 sends, at operation 215, the request to validation engine 130 and instructs validation engine 130 to validate the request. In response to the instructions, validation engine 130 accesses modification rule storage 135 and identifies one or more master data validation rules that includes a mapping that specifies the particular field of supplier data associated with the particular supplier. For this example, validation engine 130 identifies master data modification rule 200, which specifies a supplier ID of "Supplier Y," a mapping between a "Bank Details 1" field in master data stored in master data storage 110b and a "Account Number" field of data stored in supplier data storage 155 associated with Supplier Y; and a set of validation operations that includes sending a request to validation system 160.

As specified in master data validation rule 200, validation engine 130 sends, at operation 220, validation system 160 a request to validate the new bank account number for the "bank account" field along with data associated with Supplier Y (e.g., the name of the supplier, the address of the supplier, the tax identifier of the supplier, etc.). When validation system 160 receives the request along with the data associated with Supplier Y, validation system 160 determines whether the new bank account number is valid based on the data associated with Supplier Y. In this example, validation system 160 determines that the new bank account number is valid and sends, at operation 225, validation engine 130 a notification indicating so.

When validation engine 130 receives the notification, validation engine 130 identifies master data storage 110b based on the mapping specified in master data modification rule 200 and sends, at operation 230, modification manager 125 a request to modify the "Bank Details 1" field in master data storage 110b, the supplier ID (e.g., Supplier Y in this example) specified in master data modification rule 200, and the new bank account number. Upon receiving such information from validation engine 130, modification manager 125 modifies the master data stored in master data copy 120b, which is a copy of master data storage 110b. Specifically, modification manager 125 updates, at operation 235, the "Bank Details 1" field in master data storage 120b associated with Supplier Y, based on the supplier ID, with the new bank account number. Modification manager 125 then notifies master data manager 115 of the modification to master data storage 120b. In response, master data manager 115 sends, at operation 240, a notification to computing systems 110b to update master data storage 110b with the new bank account number for the "Bank Details 1" field associated with Supplier Y and sends, at operation 245, a notification to supplier network manager 150 that the request modification has been applied to the master data.

The data flow shown in FIG. 2 demonstrates an example of modifying a field of master data stored in a master data storage of a computing system in response to a request to modify a field of supplier data. In some embodiments, a user of a client device may request modification to a field of supplier data be applied to a selected set of computing systems. For example, the user of client device 165k in the example illustrated in FIG. 2 may include in the request sent to supplier network manager 150 a list of master data storages 110 (e.g., a list of master data storage IDs). Thus, when validation engine 130 accesses modification rule storage 135, validation engine 130 identifies master data modification rules that include a mapping between a field in a master data storage 110 included in the list and the particular field of supplier data associated with the particular supplier. This way, the user of client device 165k may control which computing systems 105 to apply the requested modification.

Figure 3:
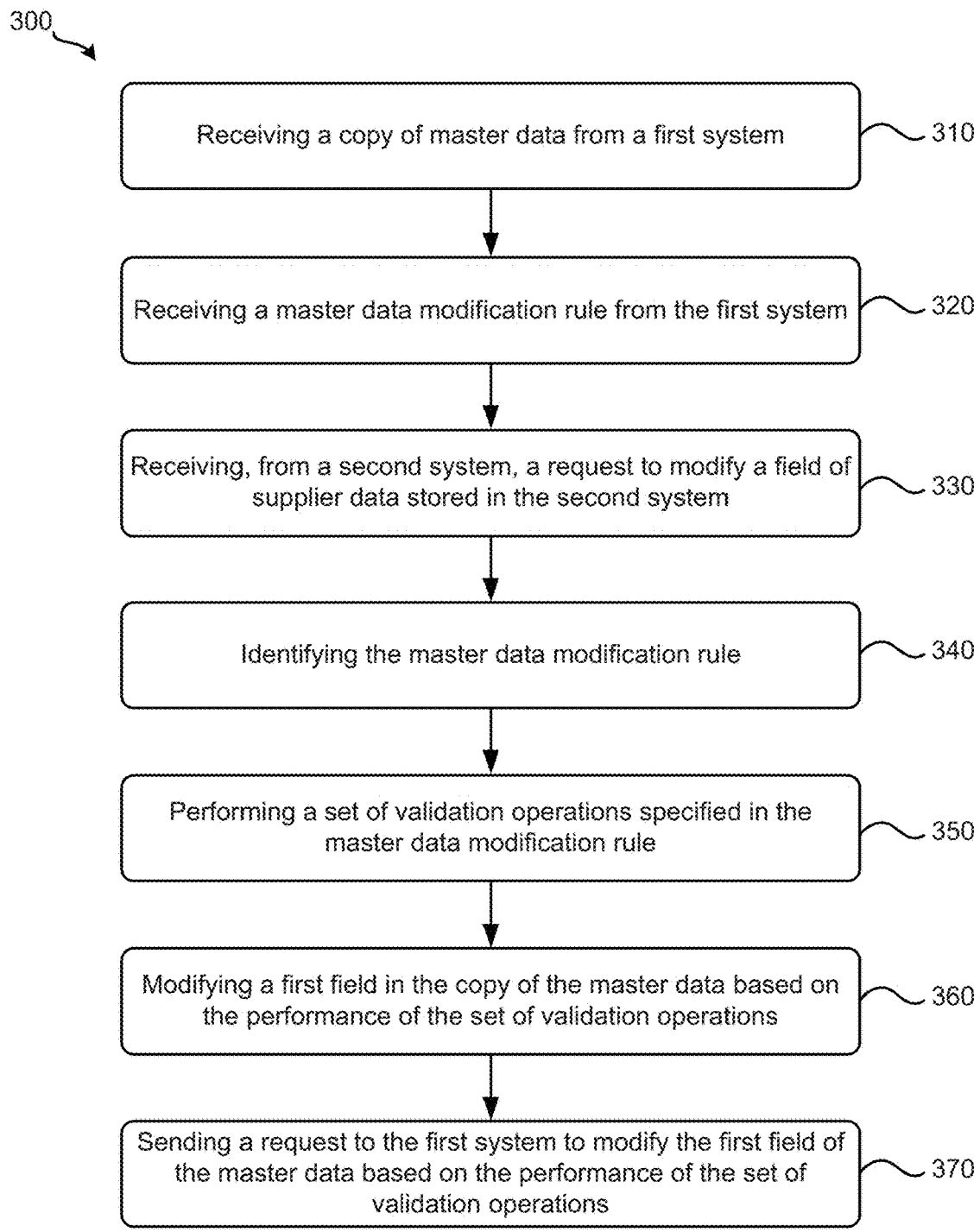
FIG. 3 illustrates a process for processing validation policies according to some embodiments.

FIG. 3 illustrates a process 300 for managing master data according to some embodiments. In some embodiments, master data manager 115 performs process 300. Process 300 starts by receiving, at 310, a copy of master data from a first system. Referring to FIG. 1 as an example, process 300 may receive a copy of master data stored in a master data storage 110 of a computing system 105. In some embodiments, the master data includes data associates with one or more suppliers.

Next process 300 receives, at 320, a master data modification rule from the first system. As mentioned above, a master data modification rule may include a supplier ID associated with a particular supplier; a mapping between a field in the master data stored in a master data storage 110 and a field of supplier data stored in supplier data storage 155 associated with the particular supplier; and a set of validation operations that are performed when a modification to the field in the supplier data is requested. Referring to FIG. 2 as an example, the master data modification rule may be master data modification rule 200.

Process 300 then receives, at 330, from a second system, a request to modify a field of supplier data stored in the second system. Referring to FIG. 2 as an example, the request may be the request sent by the user of client device 165k to supplier network manager 150 and process 300 receives the request from supplier network manager 150.

In response to the request, process 300 identifies, at 340, the master data modification rule. In some embodiments, process 300 accesses a storage (e.g., modification rule storage 1350) configure to store master data modification rules to identify the master data modification rule. Next, process 300 performs, at 350, the set of validation operations specified in the master data modification rule. As explained above, in some embodiments, a set of validation operations may include sending a request to a validation system (e.g., validation system 160) to validate the modification while, in other embodiments, a set of validation operations may include requesting a user of a computing system (e.g., a computing system 105) to provide approval for the modification.

Process 300 then modifies, at 360, the first field in the copy of the master data based on the performance of the set of validation operations. In some embodiments, process 300 modifies the first field in the copy of the master data when the set of validation operations determines that a new value for the first field in the master data is valid. Finally, process 300 sends, at 370, a request to the first system to modify the first field of the master data based on the performance of the set of validation operations. In some embodiments, process 300 sends the request to the first system when the set of validation operations determines that a new value for the first field in the master data is valid. This way, the first system may modify the first field of the master data managed by the first system thereby maintaining synchronization between the master data and the copy of the master data.

As described above, a master data storage 110 of a computing system 105 may include supplier master data associated any number of different suppliers. In some instances, a user of a computing system may wish for a list of suppliers offering a type of item at a given location. In some embodiments, supplier network manager 150 organizes suppliers according to locations associated with the suppliers and categories associated with suppliers. A location associated with a supplier may represent an area or region in which the supplier sells items. A category associated with a supplier may represent a type of item offered by the supplier for procurement. Classifying suppliers according to locations and categories allows supplier network manager 150 to provide different list of suppliers based on different locations and categories.

In some embodiments, supplier network manager 150 organizes suppliers based on locations and categories using a two-dimensional matrix. Supplier network manager 150 may use different matrices to organize suppliers associated with supplier master data stored in different master data storages 110. For instance, supplier network manager 150 may use a first matrix to organize suppliers associated with supplier master data stored in a master data storage 110a, a second matrix to organize suppliers associated with supplier master data stored in a master data storage 110b, a third matrix to organize suppliers associated with supplier master data stored in a master data storage 110c, etc. Supplier network manager 150 may manage and store matrices in supplier matrices storage 170.

FIG. 4 illustrates an example two-dimensional matrix 400 used to organize suppliers according to some embodiments. As shown, matrix 400 includes columns 405-460 and rows 465-495. Each of the columns 405-460 represents a location, which is a geographical area or region. Each of the rows 465-495 represents a category, which is a type of item. Matrix 400 also includes 5 values stored in matrix 400. S1 represents a supplier that sells IT items across the world. S2 represents a supplier that sells IT equipment in North America. S3 represents a supplier that sells desktops in California. S4 represents a supplier that sells laptops in USA. S5 represents a supplier that sells network security across the world.

Supplier network manager 150 may use, in some embodiments, a defined hierarchy of locations and a defined hierarchy of categories to traverse a two-dimensional matrix and identify suppliers. Supplier network manager 150 may use different hierarchies of categories and locations for each matrix. For instance, supplier network manager 150 may use a first hierarchy of categories and a first hierarchy of locations to traverse a first matrix, a second hierarchy of categories and a second hierarchy of locations to traverse a second matrix, a third hierarchy of categories and a third hierarchy of locations to traverse a third matrix, etc. Supplier network manager 150 may manage and store defined hierarchies of categories in category hierarchies storage 175 and defined hierarchies of locations in location hierarchies storages 180. While FIGS. 1 and 2 show storages 170-180 external to suppler network manager 150, one of ordinary skill in the art will understand that one or more storages 170-180 may be part of supplier network manager 150 in some embodiments.

Figure 5:
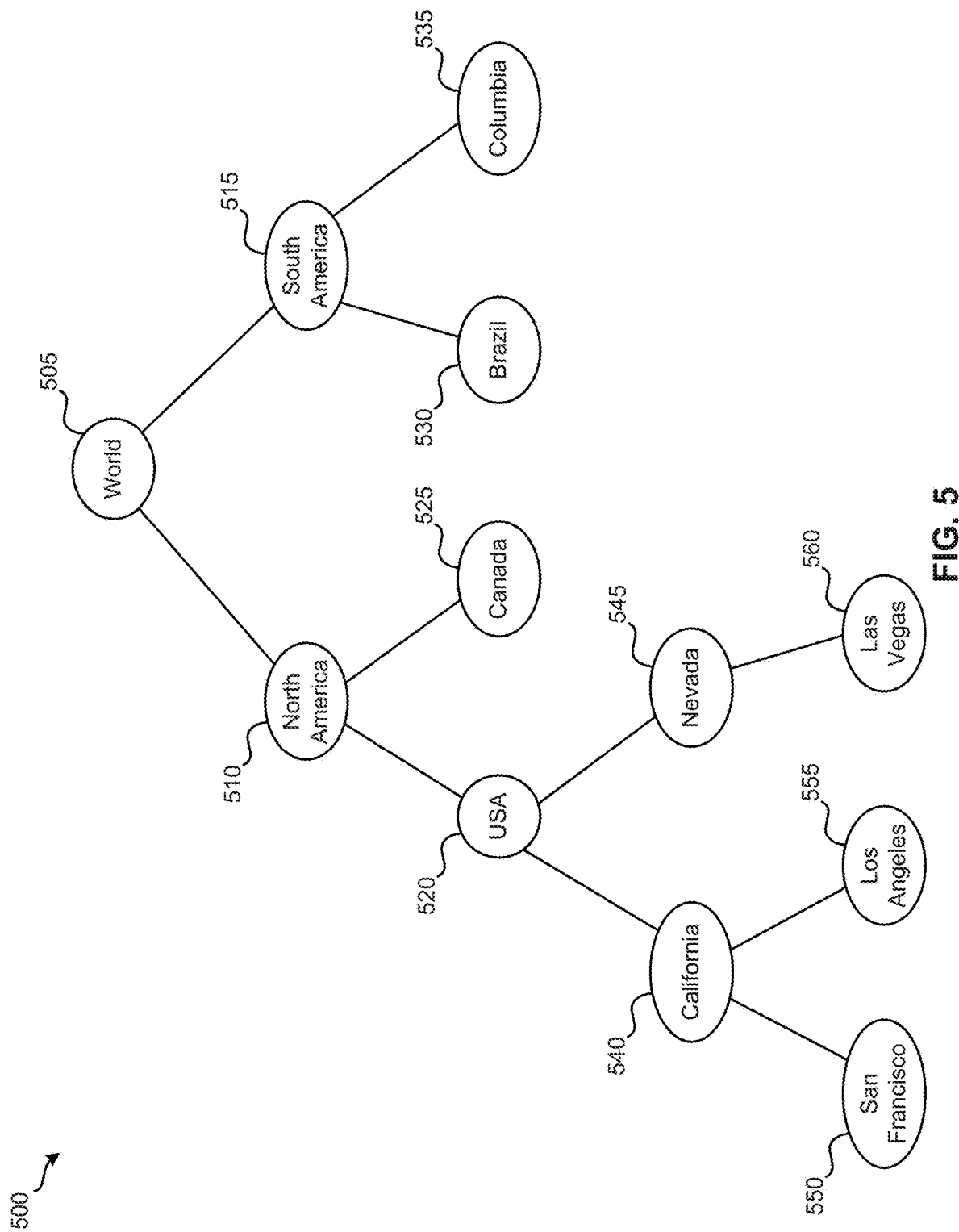
FIG. 5 illustrates an example hierarchy of locations according to some embodiments.
Figure 6:
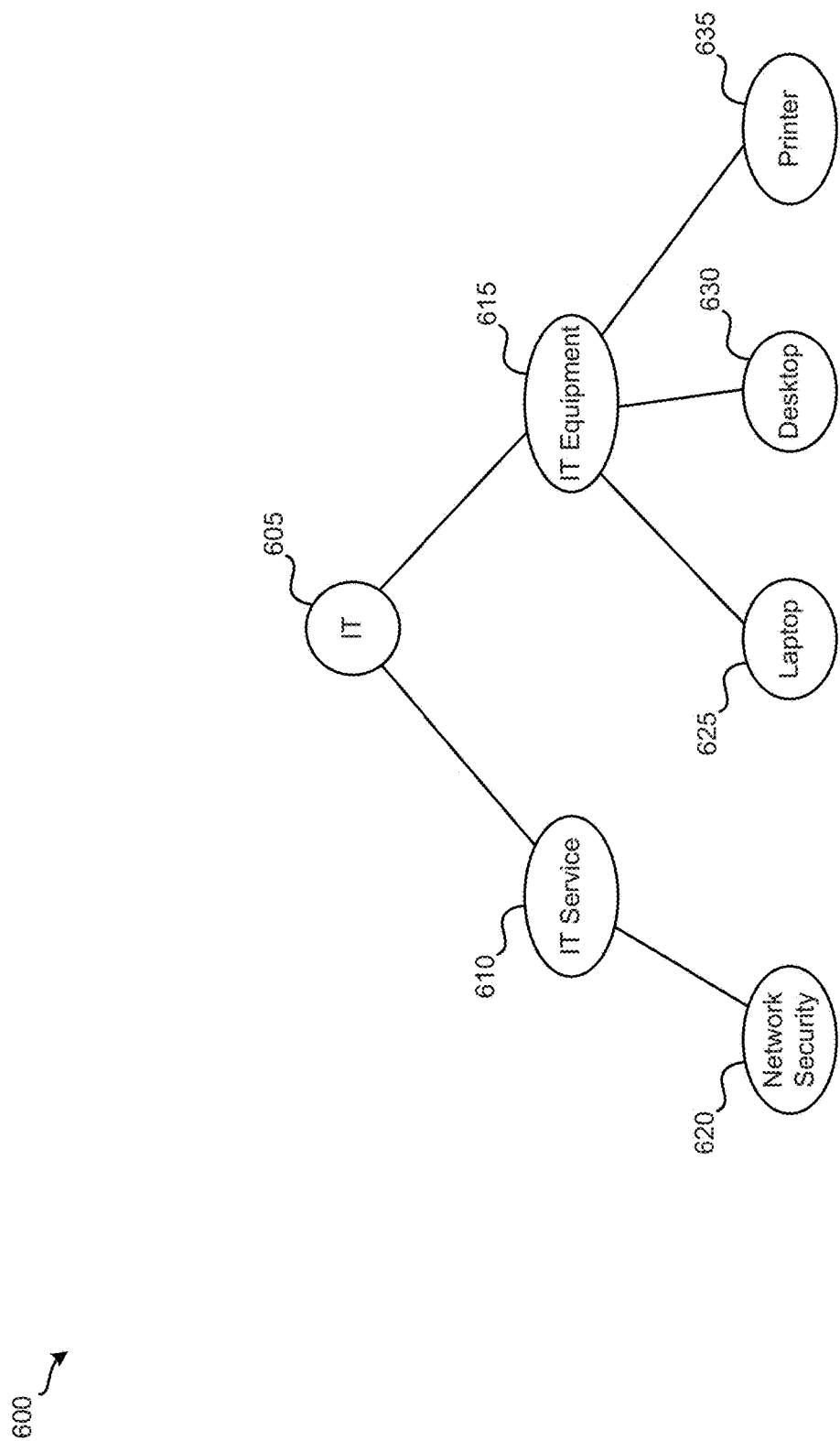
FIG. 6 illustrates an example hierarchy of categories according to some embodiments.

FIGS. 5 and 6 illustrate examples of defined hierarchies that are used to traverse the matrix illustrated in FIG. 4 according to some embodiments. In particular, FIG. 5 illustrates an example hierarchy of locations 500 according to some embodiments. As shown, hierarchy of locations 500 includes nodes 505-560 that represent the different locations illustrated in matrix 400. For this example hierarchy of locations 500, the locations are organized according to geographical areas and/or regions.

As illustrated, node 505 represents a world or global area (e.g., earth). Nodes 510 and 515 are children of node 505 that represent North America and South America regions, respectively. Nodes 520 and 525 are children nodes of node 510 that represent USA and Canada regions, respectively. Nodes 530 and 535 are children nodes of node 515 that represent Brazil and Columbia regions, respectively. Nodes 540 and 545 are children nodes of 520 that represent California and Nevada regions, respectively. Nodes 550 and 555 are children of node 540 that represent San Francisco and Los Angeles regions, respectively. Node 560 is a child of node 545 that represents a Las Vegas region.

In this example, each child node represents a sub-area of sub-region in the region represented by the parent node. Thus, a supplier that is associated with a location in the hierarchy of locations 500 indicates that the supplier sells items in the area or region associated with the location as well as any sub-areas or sub-regions of the location. For example, a supplier that is associated with the USA location indicates that the supplier sells items in the USA location as well as the California, Nevada, San Francisco and Los Angeles locations (i.e., descendants of the USA location in the hierarchy of locations 500).

FIG. 6 illustrates an example hierarchy of categories 600 according to some embodiments. As illustrated, hierarchy of categories 600 includes nodes 605-635 that represent the different categories illustrated in matrix 400. As shown, node 605 represents an IT category. Nodes 610 and 615 are children of node 605 that represent an IT services category and an IT equipment category, respectively. Node 620 is a child node of node 610 that represents a network security category. Nodes 625-635 are children nodes of node 615 that represent a laptop category, a desktop category, and a printer category, respectively.

In this example hierarchy of categories 600, the categories are organized such that each child node represents a sub-category of the category represented by the parent node. As such, a supplier that is associated with a category in the hierarchy of categories 600 indicates that the supplier sells a category of items as well as any sub-categories of items. For instance, a supplier that is associated with the IT Equipment category indicates that the supplier sells IT equipment items as well as the laptop, desktop, and printer items (i.e., descendants of the IT equipment category in the hierarchy of categories 600).

Figure 7:
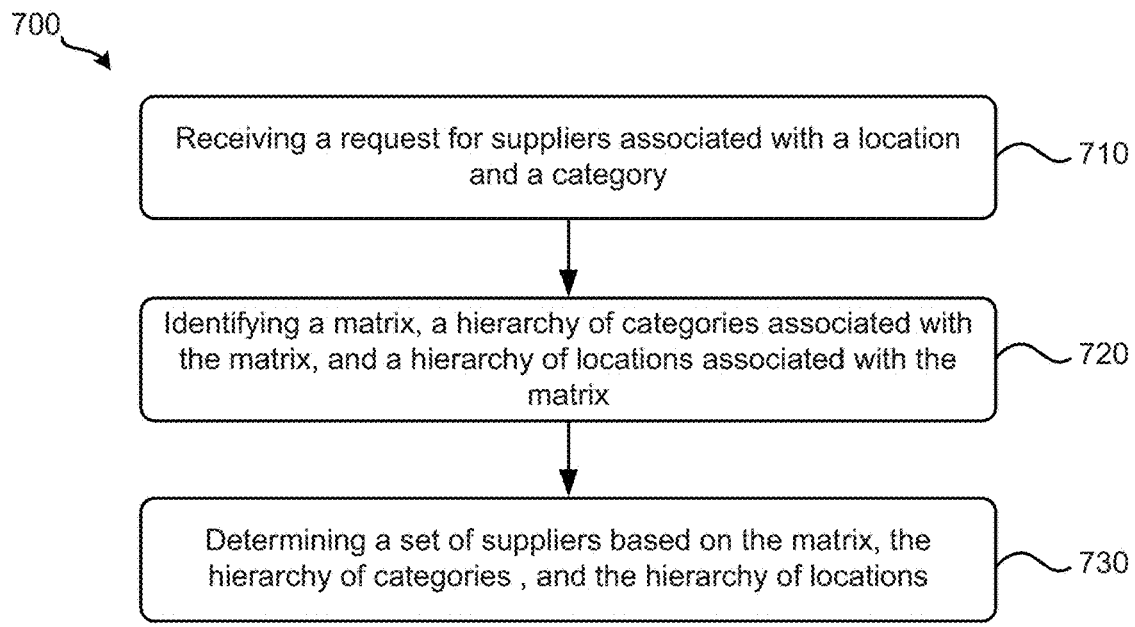
FIG. 7 illustrates a process for identifying suppliers according to some embodiments.

FIG. 7 illustrates a process 700 for identifying suppliers according to some embodiments. In some embodiments, supplier network manager 150 performs process 700. Process 700 will be described by reference to FIGS. 4-6. Process 700 starts by receiving, at 710, a request for suppliers associated with a location and a category. In some embodiments, process 700 receives the request from a user of a computing system 105. For the following example, the request is for suppliers associated with the USA location and the laptop category.

Next, process 700 identifies a matrix, a hierarchy of categories associated with matrix, and a hierarchy of locations associated with the matrix. As explained above, supplier network manager 150 may use different matrices to organize suppliers associated with supplier master data stored in different master data storages 110. As such, process 700 may identify the matrix, the hierarchy of categories, and the hierarchy of locations by accessing storages 170-180. Continuing with the example above, process 700 identifies matrix 400, hierarchy of locations 500, and hierarchy of categories 600.

Finally, process 700 determines, at 730, a set of suppliers based on the matrix, the hierarchy of categories, and the hierarchy of locations. In some embodiments, process 700 determines the set of suppliers by identifying the element in the matrix associated with the location and the category and traversing through the matrix according the hierarchy of categories and the category of locations. In different embodiments, process 700 uses different techniques for determining the set of suppliers. The following will describe one technique.

Figure 8C:
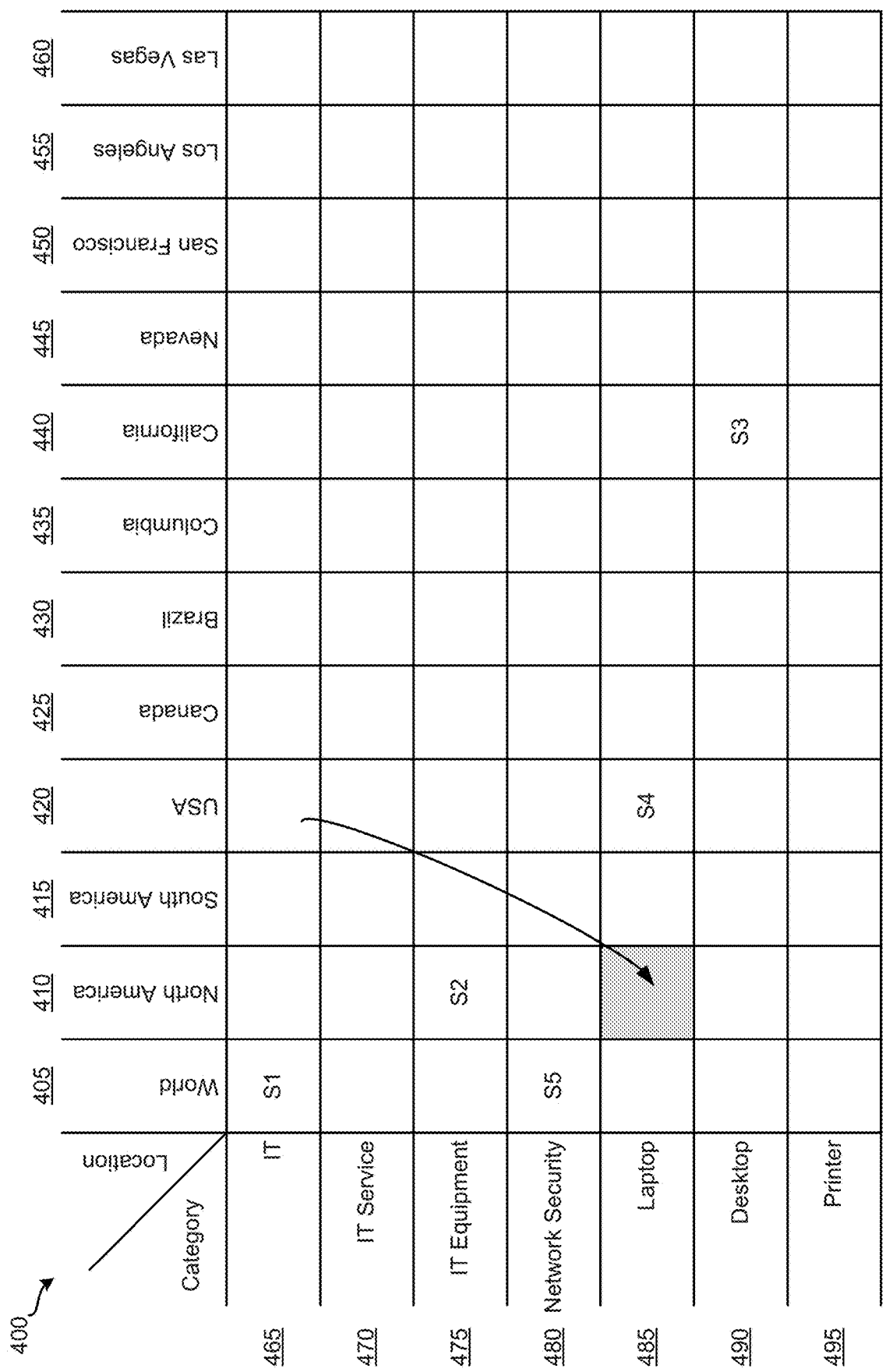

Continuing with the above example, process 700 may determine the set of suppliers by first identifying the element in matrix 400 associated with the USA location and the laptop category. FIGS. 8A-8F illustrate an example traversal through matrix 400 illustrated in FIG. 4 based on the hierarchies illustrated in FIGS. 5 and 6 according to some embodiments. As illustrated in FIG. 8A, the element in this example is at column 420 and row 485 of matrix 400, as highlighted in FIG. 8A. If any suppliers are associated with this element, process 700 includes the suppliers in the set of suppliers. According, process 700 includes supplier S4 in the set of suppliers for this example.

Next, process 700 identifies the ancestors of the category based on the hierarchy of categories 600. Specifically, process 700 identifies the category in the hierarchy of categories 600 and traverses up the hierarchy of categories 600 to identify ancestor categories of the category. In this example, process 700 identifies the IT equipment category and the IT category as the ancestors of the laptop category. Process 700 then traverses the rows of the current column in matrix 400 according to the identified ancestor categories and identifies any suppliers associated with the elements along the traversal. For this example, process 700 traverses from the element at column 420 and row 485 to the element at column 420 and row 475 (IT equipment in the USA) and then to the element at column 420 and row 465 (IT in the USA), as illustrated in FIG. 8B. If any suppliers are associated with any of the traversed elements, process 700 includes the suppliers in the set of suppliers. Since there are no suppliers at these elements in this example, process 700 does not include any suppliers in the set of suppliers.

To determine the next element to which process 700 traverses, process 700 identifies a parent location of the current location based on the hierarchy of locations 500. In particular, process 700 identifies the current location in the hierarch of locations 500 and traverses up the hierarchy of locations 500 to identify the parent location. For this example, process 700 identifies the North America location as the parent of the USA location. Process 700 then traverses to the element in the matrix associated with the parent location and the requested category. As illustrated in FIG. 8C, process 700 traverses to the element at column 410 and row 485 (laptops in North America) in matrix 400 in this example.

Next, process 700 traverses the rows of column 410 in a similar manner as traversing the rows of column 420. That is, process 700 identifies the ancestors of the category based on the hierarchy of categories 600, traverses the rows of the current column in matrix 400 according to the identified ancestor categories, and identifies any suppliers associated with the elements along the traversal. In this example, process 700 traverses from the element at column 410 and row 485 to the element at column 410 and row 475 (IT equipment in North America) and then to the element at column 410 and row 465 (IT in North America), as shown in FIG. 8D. Again, if any suppliers are associated with any of the traversed elements, process 700 includes the suppliers in the set of suppliers. For this example, process 700 includes supplier S2 in the set of suppliers.

Process 700 determines the next element to traverse to in a similar way as described above. That is, process 700 identifies a parent location of the current location based on the hierarchy of locations 500 and then traverses to the element in the matrix associated with the parent location and the requested category. For this example, the Norther America location is the current location so process 700 identifies the world location as the parent of the North America location based on the hierarchy of locations 500. Thus, process 700 traverses to the element at column 405 and row 485 (laptops in the world) in matrix 400 in this example, as shown in FIG. 8E.

Process 700 then traverses the rows of column 405 in a similar manner as traversing the rows of columns 420 and 410. That is, process 700 identifies the ancestors of the category based on the hierarchy of categories 600, traverses the rows of the current column in matrix 400 according to the identified ancestor categories, and identifies any suppliers associated with the elements along the traversal. For this example, process 700 traverses from the element at column 405 and row 485 to the element at column 405 and row 475 (IT equipment in the world) and then to the element at column 405 and row 465 (IT in the world), as illustrated in FIG. 8F. Again, if any suppliers are associated with any of the traversed elements, process 700 includes the suppliers in the set of suppliers. In this example, process 700 includes supplier S1 in the set of suppliers.

Process 700 determines the next element to traverse to in a similar way as described above. That is, process 700 identifies a parent location of the current location based on the hierarchy of locations 500 and then traverses to the element in the matrix associated with the parent location and the requested category. In this example, the world location is the current location and there is no parent location of the world location based on the hierarchy of locations 500. Therefore, process 700 determines the set of supplies as the suppliers associated with the elements traversed during the traversal through matrix 400. In this example, the set of suppliers includes suppliers S4, S2 and S1.

As discussed above, supplier network manager 150 uses a two-dimensional matrix to organize suppliers based on locations and categories associated with the suppliers. In some embodiments, supplier network manager 150 adds suppliers to a matrix through a qualification process. A supplier may be qualified for a particular location and a particular category. When a supplier is qualified for a particular location and a particular category, the supplier is associated with the particular location and the particular category and supplier network manager 150 adds the supplier to the element in the matrix associated with the particular location and the particular category.

In some embodiments, a qualification process may include supplier network manager 150 sending a candidate supplier (e.g., a user of a client device 165), one or more sets of questions. A set of question may include any number of different questions that prompt the candidate supplier for answers. Different sets of questions may be sent to a candidate supplier when qualifying the candidate supplier for different locations and different categories. In some embodiments, supplier network manager 150 may dynamically generate an aggregate collection of questions based on the location and category for which a candidate supplier is requested to be qualified.

In some embodiments, supplier network manager 150 organizes sets of questions based on locations and categories using a two-dimensional matrix. Each computing system 105 may define different sets of questions based on different locations and different categories and send the defined sets of questions to supplier network manager 150. Supplier network manager 150 may manage and store the defined sets of questions in question sets storage 185. While FIGS. 1 and 2 show storage 185 external to supper network manager 150, one of ordinary skill in the art will understand that storages 185 may be part of supplier network manager 150 in some embodiments.

Supplier network manager 150 may use different matrices to organize sets of questions defined by different computing systems 105. For example, supplier network manager 150 may use a first matrix to organize sets of questions defined by computing system 110a, a second matrix to organize sets of questions defined by computing system 110b, a third matrix to organize sets of questions defined by computing system 110c, etc. Supplier network manager 150 may manage and store such matrices in supplier matrices storage 170.

FIG. 9 illustrates an example two-dimensional matrix 900 used to organize sets of questions according to some embodiments. As shown, matrix 900 includes columns 905-960 and rows 965-495, which are the same as columns 405-460 and rows 965-999, respectively. Matrix 900 also includes multiple values stored in matrix 900.

For this example, a first set of questions (QS1) have been defined for all categories in the Brazil location. Thus, QS1 is stored in each element in column 930, which represents the location Brazil. A second set of questions (QS2) have been defined for the IT service category in all locations. As such, QS2 is stored in each element in row 970, which represents the IT service category. A third set of questions (QS3) have been defined for the network security category in the California location. Therefore, QS3 is stored in the element at column 940, which represents the California location, and row 980, which represents the network security category. A fourth set of questions (QS4) have been defined for the printer category in the USA location. Thus, QS4 is stored in the element at column 920, which represents the USA location, and row 995, which represents the printer category.

In some embodiments, supplier network manager 150 may use a defined hierarchy of locations and a defined hierarchy of categories to traverse a two-dimensional matrix and identify suppliers. Supplier network manager 150 may use different hierarchies of categories and locations for each matrix. For instance, supplier network manager 150 may use a first hierarchy of categories and a first hierarchy of locations to traverse a first matrix, a second hierarchy of categories and a second hierarchy of locations to traverse a second matrix, a third hierarchy of categories and a third hierarchy of locations to traverse a third matrix, etc. Supplier network manager 150 may manage and store defined hierarchies of categories in category hierarchies storage 175 and defined hierarchies of locations in location hierarchies storages 180.

Figure 10:
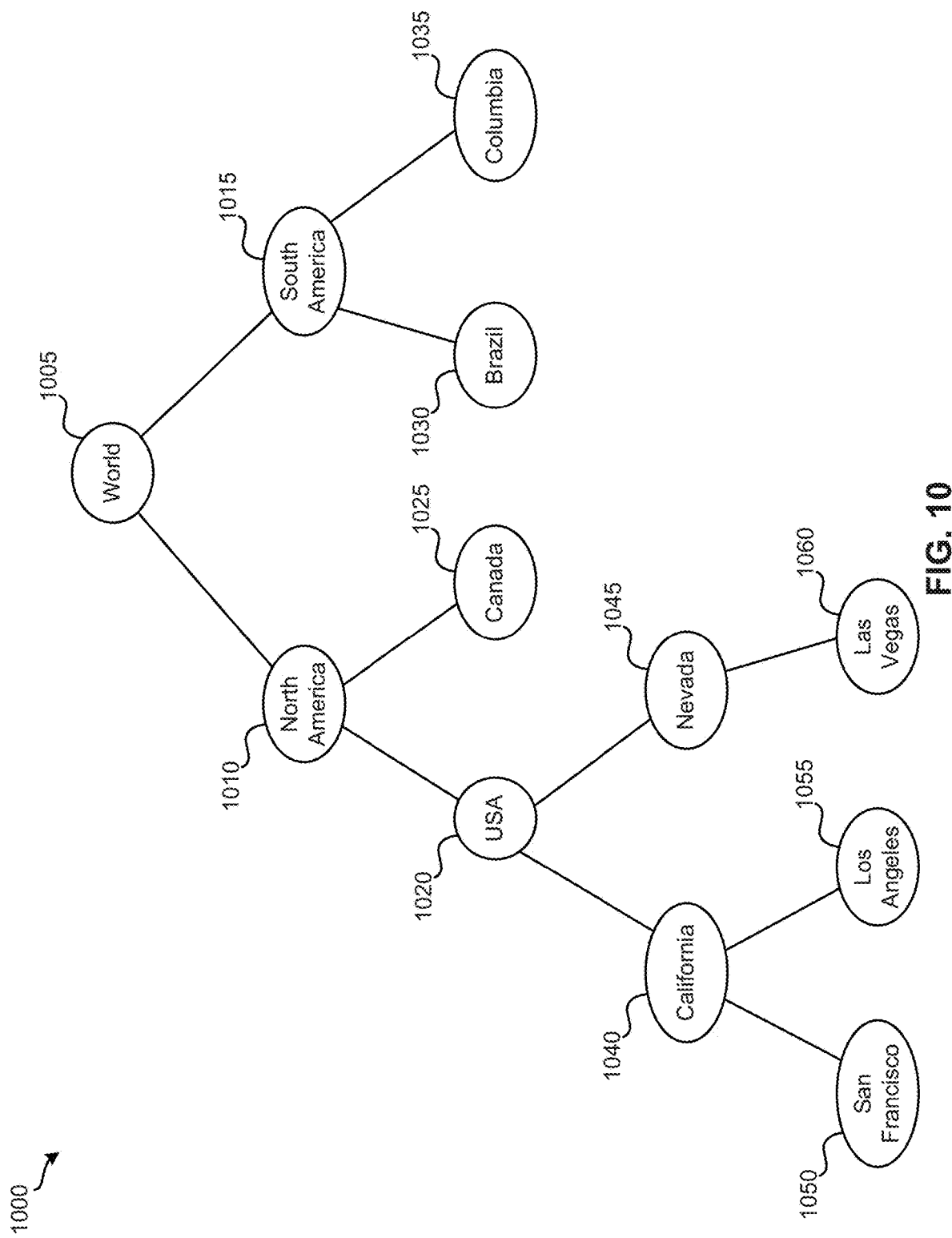
FIG. 10 illustrates an example hierarchy of locations according to some embodiments.
Figure 11:
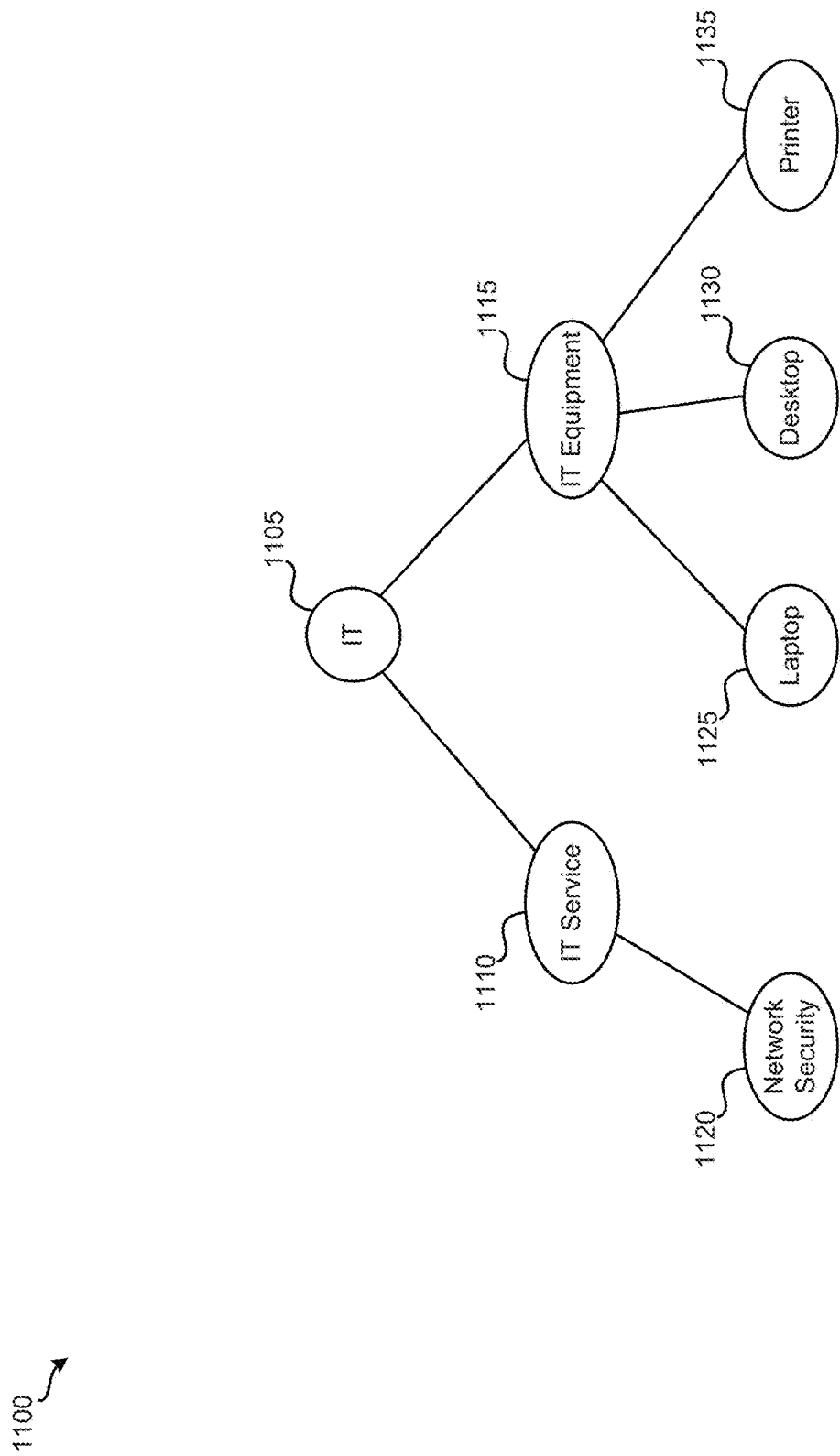
FIG. 11 illustrates an example hierarchy of categories according to some embodiments.

FIGS. 10 and 11 illustrate examples of defined hierarchies that are used to traverse the matrix illustrated in FIG. 9 according to some embodiments. In particular, FIG. 10 illustrates an example hierarchy of locations 1000 according to some embodiments. As shown, hierarchy of locations 1000 includes nodes 1005-1060 that represent the different locations illustrated in matrix 900. For this example hierarchy of locations 1000, the locations are organized according to geographical areas and/or regions. Nodes 1005-1060 represent the same locations as nodes 505-560 shown in FIG. 5.

For this example, each child node represents a sub-area of sub-region in the region represented by the parent node. In some embodiments, when a candidate supplier is requested to be qualified for a location, supplier network manager 150 sends the candidate supplier questions associated with the location as well questions associated with any sub-areas or sub-regions of the location. For instance, when a candidate supplier is requested to be qualified for the South America location, supplier network manager 150 sends questions associated with the South America location as well as questions associated with the Brazil and Columbia locations (i.e., descendants of the South America location in the hierarchy of locations 1000).

FIG. 11 illustrates an example hierarchy of categories 1100 according to some embodiments. As illustrated, hierarchy of categories 1100 includes nodes 1105-1135 that represent the different categories illustrated in matrix 400. Nodes 1105-1135 represent the same categories as nodes 605-635 illustrated in FIG. 6.

For this example hierarchy of categories 1100, the categories are organized such that each child node represents a sub-category of the category represented by the parent node. In some embodiments, when a candidate supplier is requested to be qualified for a category, supplier network manager 150 sends the candidate supplier questions associated with the category as well questions associated with any sub-categories. For example, when a candidate supplier is requested to be qualified for the IT equipment category, supplier network manager 150 sends questions associated with the IT equipment category as well as questions associated with the laptop, desktop, and printer categories (i.e., descendants of the IT equipment category in the hierarchy of categories 1100).

Figure 12:
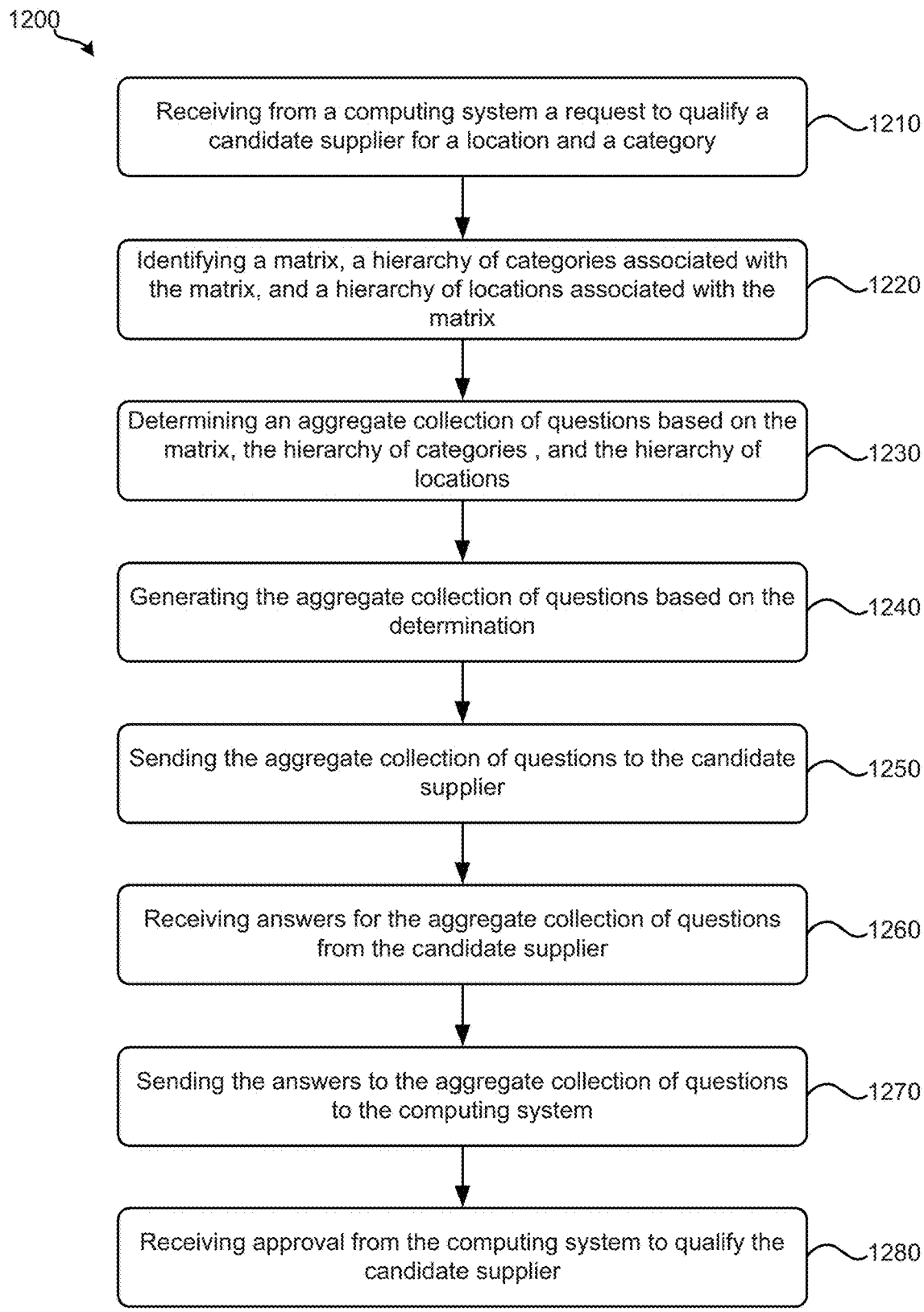
FIG. 12 illustrates a process for generating an aggregate collection of questions according to some embodiments.

FIG. 12 illustrates a process 1200 for generating an aggregate collection of questions according to some embodiments. In some embodiments, supplier network manager 150 performs process 1200. Process 1200 will be described by reference to FIGS. 9-11. Process 1200 starts by receiving, at 1210, from a computing system, a request to qualify a candidate supplier for a location and a category. The request to qualify the candidate supplier may, in some embodiments, include a request for questions associated with the location and the category. In some embodiments, process 1200 receives the request from a user of a computing system 105. For the following example, the request is to qualify a candidate supplier for the California location and the IT category.

Next, process 1200 identifies a matrix, a hierarchy of categories associated with matrix, and a hierarchy of locations associated with the matrix. As explained above, supplier network manager 150 may use different matrices to organize sets of questions defined by different computing systems 105. Thus, process 1200 may identify the matrix, the hierarchy of categories, and the hierarchy of locations by accessing storages 170-180. Continuing with the example above, process 1200 identifies matrix 900, hierarchy of locations 1000, and hierarchy of categories 1100.

Process 1200 then determines, at 1230, an aggregate collection of questions based on the matrix, the hierarchy of categories, and the hierarchy of locations. In some embodiments, process 1200 determines the set of suppliers by identifying the element in the matrix associated with the location and the category and traversing through the matrix according the hierarchy of categories and the category of locations. In different embodiments, process 700 uses different techniques for determining the aggregate collection of questions. The following will describe one technique.

Figure 13C:
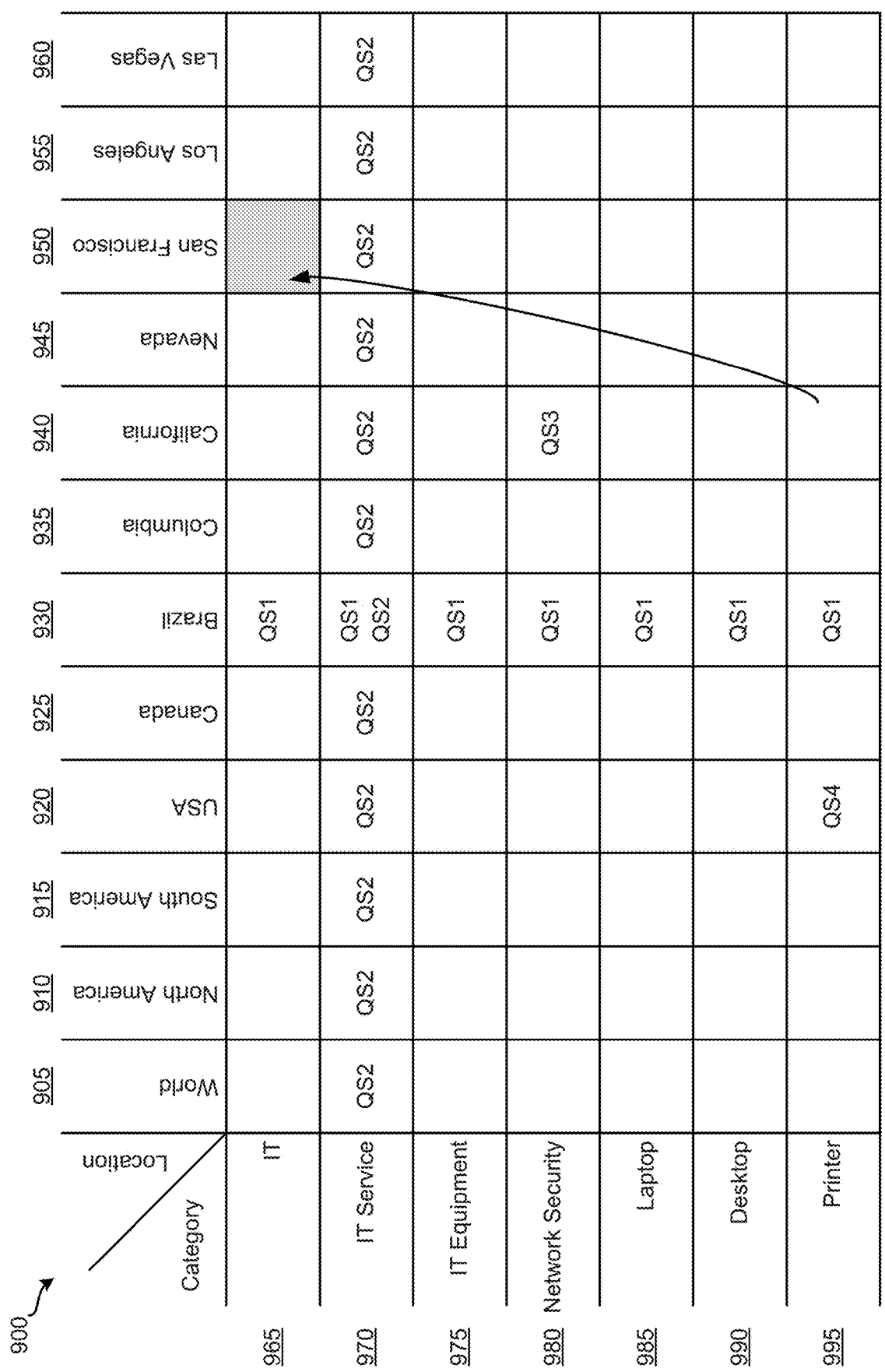

Continuing with the above example, process 1200 may determine the aggregate collection of questions by first identifying the element in matrix 900 associated with the California location and the IT category. FIGS. 13A-13F illustrate an example traversal through matrix 900 illustrated in FIG. 9 based on the hierarchies illustrated in FIGS. 10 and 11 according to some embodiments. As shown in FIG. 13A, the element in this example is at column 940 and row 965 of matrix 900, as highlighted in FIG. 13A. If any sets of questions are associated with this element (which none are in this example), process 1200 includes the sets of questions in the aggregate collection of questions.

Next, process 1200 identifies the descendants of the category based on the hierarchy of categories 1100. Specifically, process 1200 identifies the category in the hierarchy of categories 1100 and traverses down the hierarchy of categories 1100 to identify descendant categories of the category. For this example, process 1200 identifies the IT service category, the network security category, IT equipment category, the laptop category, the desktop category, and the printer category as the descendants of the IT category. Process 1200 then traverses the rows of the current column in matrix 900 according to the identified descendant categories and identifies any sets of questions associated with the elements along the traversal. In this example, process 1200 traverses from the element at column 940 and row 965 to the elements at column 940 and row 970 (IT service in California), column 940 and row 980 (network security in California), column 940 and row 975 (IT equipment in California), column 940 and row 985 (laptops in California), column 940 and row 990 (desktops in California), and column 940 and row 995 (printers in California), as illustrated in FIG. 13B. If any sets of questions are associated with any of the traversed elements, process 1200 includes the sets of questions in the aggregate collection of questions. In this example, process 1200 includes the set of questions QS2 and the set of questions QS3 in the aggregate collection of questions.

To determine the next element to which process 1200 traverses, process 1200 identifies a descendent location of the requested location that has not been traversed based on the hierarchy of locations 1000. In particular, process 1200 identifies the requested location in the hierarch of locations 1000 and traverses down the hierarchy of locations 1000 to identify a descendant location. In this example, process 1200 identifies the San Francisco location as a descendant of the California location. Process 1200 then traverses to the element in the matrix associated with the descendant location and the requested category. As shown in FIG. 13C, process 1200 traverses to the element at column 990 and row 965 (IT in San Francisco) in matrix 900 in this example.

Next, process 1200 traverses the rows of column 950 in a similar manner as traversing the rows of column 940. That is, process 1200 identifies the descendants of the requested category based on the hierarchy of categories 1100, traverses the rows of the current column in matrix 900 according to the identified descendant categories, and identifies any sets of questions associated with the elements along the traversal. For this example, process 1200 traverses from the element at column 950 and row 965 to the elements at column 950 and row 970 (IT service in San Francisco), column 950 and row 980 (network security in San Francisco), column 950 and row 975 (IT equipment in San Francisco), column 950 and row 985 (laptops in San Francisco), column 950 and row 990 (desktops in San Francisco), and column 950 and row 995 (printers in San Francisco), as shown in FIG. 13D. Again, if any sets of questions are associated with any of the traversed elements, process 1200 includes the sets of questions in the aggregate collection of questions. In this example, the set of questions QS2 is associated with a traversed element. However, the set of questions QS2 has already been included in the aggregate collection of questions, as explained above. Thus, process 1200 does not include any sets of questions in the aggregate collection of questions.

Figure 13E:
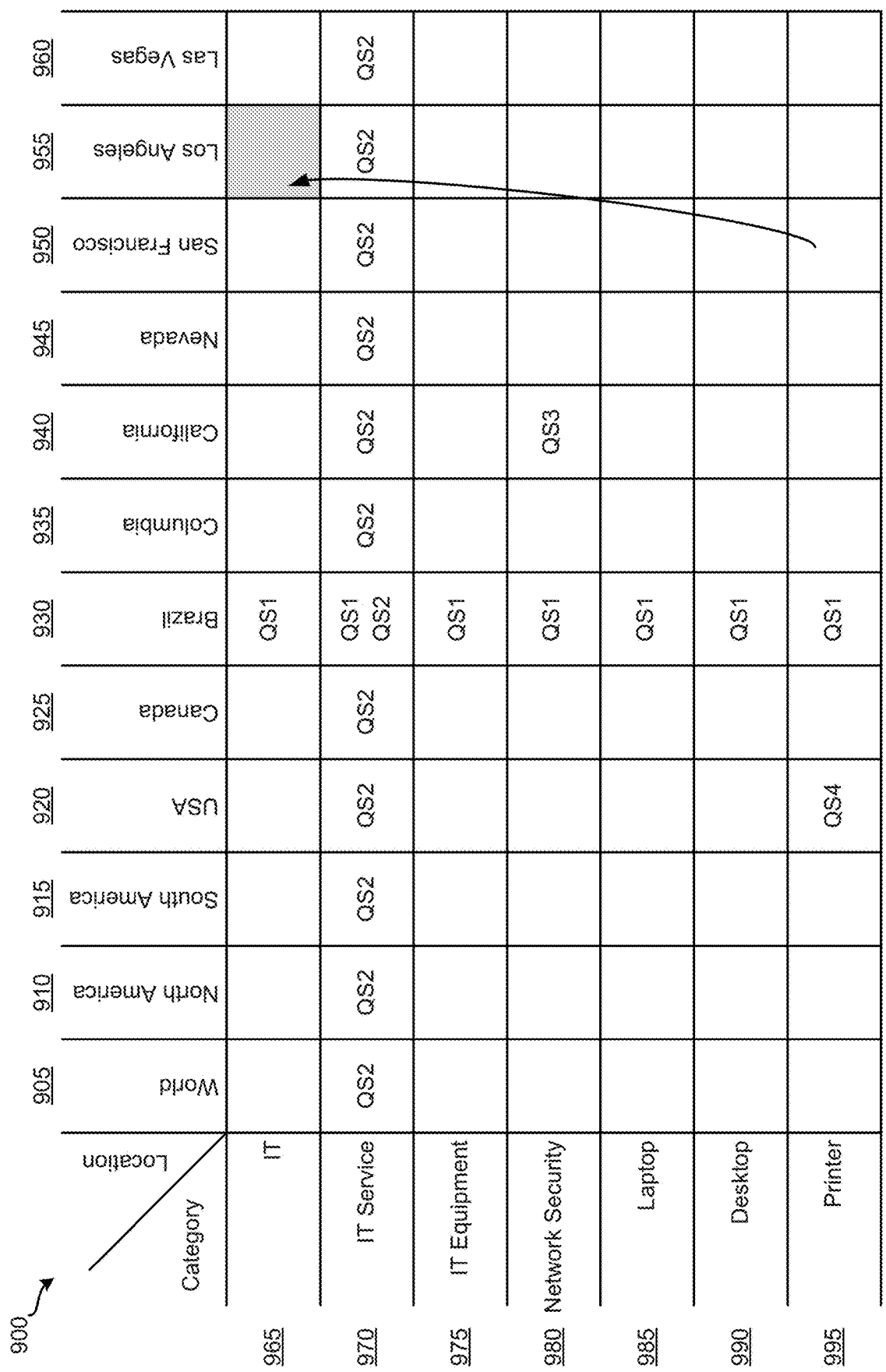

Process 1200 determines the next element to traverse to in a similar way as described above. That is, process 1200 identifies a descendent location of the requested location that has not been traversed based on the hierarchy of locations 1000 and then traverses to the element in the matrix associated with the descendent location and the requested category. In this example, process 1200 identifies the Los Angeles location as a descendant of the California location that has not been traversed based on the hierarchy of locations 1000. Thus, process 1200 traverses to the element at column 955 and row 965 (laptops in the world) in matrix 900 in this example, as shown in FIG. 13E.

Process 1200 then traverses the rows of column 955 in a similar manner as traversing the rows of columns 940 and 950. That is, process 1200 identifies the descendants of the requested category based on the hierarchy of categories 1100, traverses the rows of the current column in matrix 900 according to the identified descendant categories, and identifies any sets of questions associated with the elements along the traversal. In this example, process 1200 traverses from the element at column 955 and row 965 to the elements at column 955 and row 970 (IT service in Los Angeles), column 955 and row 980 (network security in Los Angeles), column 955 and row 975 (IT equipment in Los Angeles), column 955 and row 985 (laptops in Los Angeles), column 955 and row 990 (desktops in Los Angeles), and column 955 and row 995 (printers in Los Angeles), as illustrated in FIG. 13F. Again, if any sets of questions are associated with any of the traversed elements, process 1200 includes the sets of questions in the aggregate collection of questions. For this example, the set of questions QS2 is associated with a traversed element. However, the set of questions QS2 has already been included in the aggregate collection of questions, as explained above. Thus, process 1200 does not include any sets of questions in the aggregate collection of questions.

Process 1200 determines the next element to traverse to in a similar way as described above. That is, process 1200 identifies a descendent location of the requested location that has not been traversed based on the hierarchy of locations 1000 and then traverses to the element in the matrix associated with the descendent location and the requested category. In this example, there are no more descendant locations of the California location that have not been traversed based on the hierarchy of locations 1000. Thus, process 1200 determines the aggregate collection of questions as the sets of questions associated with the elements traversed during the traversal through matrix 900. For this example, the aggregate collection of questions includes the set of questions QS2 and the set of questions QS3.

Returning to FIG. 12, after determining the aggregate collection of question, process 1200 generates, at 1240, the aggregate collection of questions based on the determination. Next, process 1200 sends, at 1250, the aggregate collection of questions to the candidate supplier. In some embodiments, process 1200 sends the aggregate collection of question to the candidate supplier when a user of a client device 165 logs onto the portal provided by supplier network manager 150 using an account associated with the candidate supplier.

Process 1200 then receives, at 1260, answers to the aggregate collection of questions from the candidate supplier. Once process 1200 receives the answers, process 1200 sends the answers to the aggregate collection of questions to the computing system. Finally, process 1200 receives, at 1280, approval from the computing system to qualify the candidate supplier. Once process 1200 receives approval from the computing system, process 1200 may add the candidate supplier to a matrix (e.g., matrix 400) used to organize suppliers associated with master data of the computing system.

In some embodiments, a user of the computing system may approve a candidate supplier for a particular supplier level (e.g., a level one supplier, a level two supplier, a level three supplier, etc.) in addition to a location and category. This allows a user of a computing system 105 to segregate between different suppliers at a given location and category according to the supplier level of the suppliers. In some embodiments, supplier network manage 150 stores the supplier level along with the suppliers in the matrix used to organize the suppliers. In this manner, supplier network manager 150 to provide suppliers with different supplier levels when supplier network manager 150 receives requests from a user of a computing system 105.

The embodiments and examples described above by reference to FIGS. 4-13 demonstrate supplier network manager 150 organizing suppliers based on locations and categories. One of ordinary skill in the art will appreciate that the supplier network manager 150 may organize suppliers based on additional and/or different characteristics or qualities associated with suppliers. For instance, supplier network manager 150 may organize suppliers based on n criteria. In some embodiments, supplier network manager 150 may organize suppliers based on n criteria using an n-dimensional matrix and n number of defined hierarchies for each of the n criteria.

Figure 14:
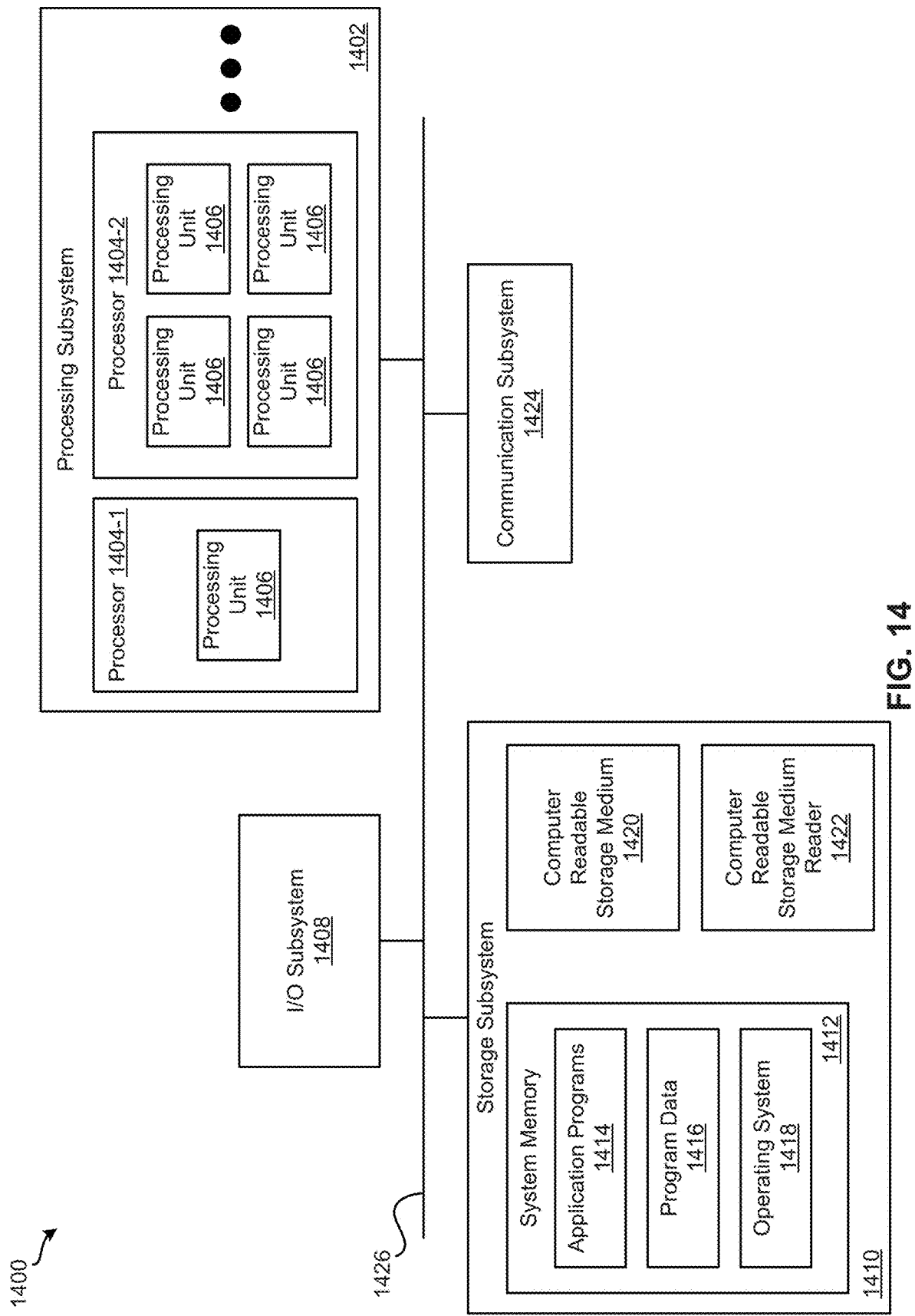
FIG. 14 illustrates an exemplary computer system, in which various embodiments may be implemented.

FIG. 14 illustrates an exemplary computer system 1400, in which various embodiments may be implemented. For example, computer system 1400 may be used to implement computing systems 105 and/or supplier network manager 150. Computer system 1400 may be a desktop computer, a laptop, a server computer, or any other type of computer system or combination thereof. Some or all elements of master data manager 115 in FIG. 1, or combinations thereof can be included or implemented in computer system 1400. In addition, computer system 1400 can implement many of the operations, methods, and/or processes described above (e.g., processes, 300, 700, and 1200). As shown in FIG. 14, computer system 1400 includes processing subsystem 1402, which communicates, via bus subsystem 1402, with input/output (I/O) subsystem 1408, storage subsystem 1410 and communication subsystem 1424.

Bus subsystem 1402 is configured to facilitate communication among the various components and subsystems of computer system 1400. While bus subsystem 1402 is illustrated in FIG. 14 as a single bus, one of ordinary skill in the art will understand that bus subsystem 1402 may be implemented as multiple buses. Bus subsystem 1402 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 1402, which can be implemented as one or more integrated circuits (e.g., a conventional microprocessor or microcontroller), controls the operation of computer system 1400. Processing subsystem 1402 may include one or more processors 1404. Each processor 1404 may include one processing unit 1406 (e.g., a single core processor such as processor 1404-1) or several processing units 1406 (e.g., a multicore processor such as processor 1404-2). In some embodiments, processors 1404 of processing subsystem 1402 may be implemented as independent processors while, in other embodiments, processors 1404 of processing subsystem 1402 may be implemented as multiple processors integrate into a single chip or multiple chips. Still, in some embodiments, processors 1404 of processing subsystem 1402 may be implemented as a combination of independent processors and multiple processors integrated into a single chip or multiple chips.

In some embodiments, processing subsystem 1402 can execute a variety of programs or processes in response to program code and can maintain multiple concurrently executing programs or processes. At any given time, some or all of the program code to be executed can reside in processing subsystem 1402 and/or in storage subsystem 1410. Through suitable programming, processing subsystem 1402 can provide various functionalities, such as the functionalities described above by reference to processes 300, 700, and 1200, etc.

I/O subsystem 1408 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 1400 to a user or another device (e.g., a printer).

As illustrated in FIG. 14, storage subsystem 1410 includes system memory 1412, computer-readable storage medium 1420, and computer-readable storage medium reader 1422. System memory 1412 may be configured to store software in the form of program instructions that are loadable and executable by processing subsystem 1402 as well as data generated during the execution of program instructions. In some embodiments, system memory 1412 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 1412 may include different types of memory, such as static random access memory (SRAM) and/or dynamic random access memory (DRAM). System memory 1412 may include a basic input/output system (BIOS), in some embodiments, that is configured to store basic routines to facilitate transferring information between elements within computer system 1400 (e.g., during start-up). Such a BIOS may be stored in ROM (e.g., a ROM chip), flash memory, or any other type of memory that may be configured to store the BIOS.

As shown in FIG. 14, system memory 1412 includes application programs 1414, program data 1416, and operating system (OS) 1418. OS 1418 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 1420 may be a non-transitory computer-readable medium configured to store software (e.g., programs, code modules, data constructs, instructions, etc.). Many of the components (e.g., master data manager 115 and supplier network manager 150) and/or processes (e.g., processes 300, 700, and 1200) described above may be implemented as software that when executed by a processor or processing unit (e.g., a processor or processing unit of processing subsystem 1402) performs the operations of such components and/or processes. Storage subsystem 1410 may also store data used for, or generated during, the execution of the software.

Storage subsystem 1410 may also include computer-readable storage medium reader 1422 that is configured to communicate with computer-readable storage medium 1420. Together and, optionally, in combination with system memory 1412, computer-readable storage medium 1420 may comprehensively represent remote, local, fixed, and/or removable storage devices plus storage media for temporarily and/or more permanently containing, storing, transmitting, and retrieving computer-readable information.

Computer-readable storage medium 1420 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 1424 serves as an interface for receiving data from, and transmitting data to, other devices, computer systems, and networks. For example, communication subsystem 1424 may allow computer system 1400 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 1424 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 1424 may provide components configured for wired communication (e.g., Ethernet) in addition to or instead of components configured for wireless communication.

One of ordinary skill in the art will realize that the architecture shown in FIG. 14 is only an example architecture of computer system 1400, and that computer system 1400 may have additional or fewer components than shown, or a different configuration of components. The various components shown in FIG. 14 may be implemented in hardware, software, firmware or any combination thereof, including one or more signal processing and/or application specific integrated circuits.

Figure 15:
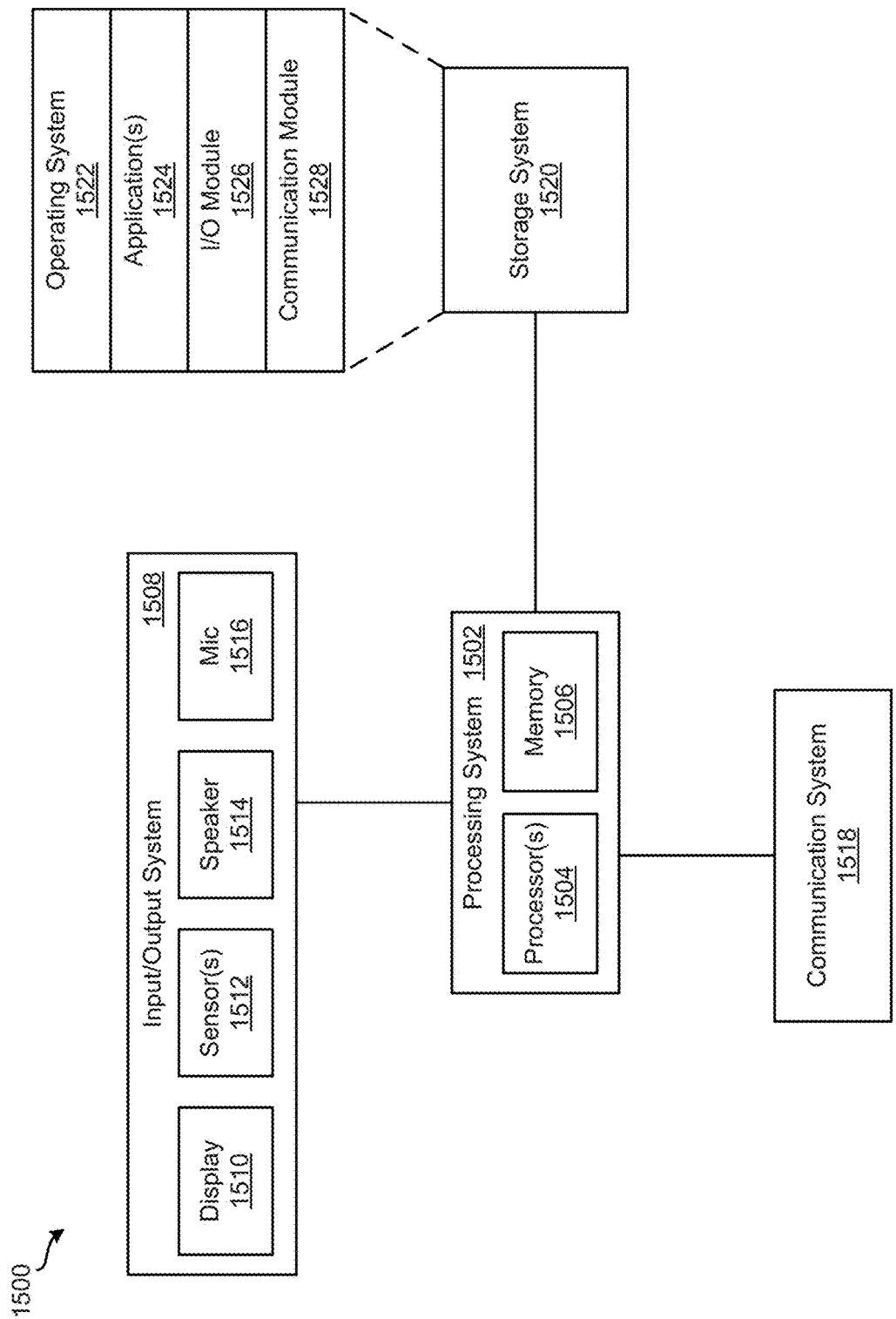
FIG. 15 illustrates an exemplary computing device, in which various embodiments may be implemented.

FIG. 15 illustrates an exemplary computing device 1500, in which various embodiments may be implemented. For example, computing device 1500 may be used to implement devices computing systems 105 and/or client devices 165. Computing device 1500 may be a cellphone, a smartphone, a wearable device, an activity tracker or manager, a tablet, a personal digital assistant (PDA), a media player, or any other type of mobile computing device or combination thereof. As shown in FIG. 15, computing device 1500 includes processing system 1502, input/output (I/O) system 1508, communication system 1518, and storage system 1520. These components may be coupled by one or more communication buses or signal lines.

Processing system 1502, which can be implemented as one or more integrated circuits (e.g., a conventional microprocessor or microcontroller), controls the operation of computing device 1500. As shown, processing system 1502 includes one or more processors 1504 and memory 1506. Processors 1504 are configured to run or execute various software and/or sets of instructions stored in memory 1506 to perform various functions for computing device 1500 and to process data.

Each processor of processors 1504 may include one processing unit (e.g., a single core processor) or several processing units (e.g., a multicore processor). In some embodiments, processors 1504 of processing system 1502 may be implemented as independent processors while, in other embodiments, processors 1504 of processing system 1502 may be implemented as multiple processors integrate into a single chip. Still, in some embodiments, processors 1504 of processing system 1502 may be implemented as a combination of independent processors and multiple processors integrated into a single chip.

Memory 1506 may be configured to receive and store software (e.g., operating system 1522, applications 1524, I/O module 1526, communication module 1528, etc. from storage system 1520) in the form of program instructions that are loadable and executable by processors 1504 as well as data generated during the execution of program instructions. In some embodiments, memory 1506 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1508 is responsible for receiving input through various components and providing output through various components. As shown for this example, I/O system 1508 includes display 1510, one or more sensors 1512, speaker 1514, and microphone 1516. Display 1510 is configured to output visual information (e.g., a graphical user interface (GUI) generated and/or rendered by processors 1504). In some embodiments, display 1510 is a touch screen that is configured to also receive touch-based input. Display 1510 may be implemented using liquid crystal display (LCD) technology, light-emitting diode (LED) technology, organic LED (OLED) technology, organic electro luminescence (OEL) technology, or any other type of display technologies. Sensors 1512 may include any number of different types of sensors for measuring a physical quantity (e.g., temperature, force, pressure, acceleration, orientation, light, radiation, etc.). Speaker 1514 is configured to output audio information and microphone 1516 is configured to receive audio input. One of ordinary skill in the art will appreciate that I/O system 1508 may include any number of additional, fewer, and/or different components. For instance, I/O system 1508 may include a keypad or keyboard for receiving input, a port for transmitting data, receiving data and/or power, and/or communicating with another device or component, an image capture component for capturing photos and/or videos, etc.

Communication system 1518 serves as an interface for receiving data from, and transmitting data to, other devices, computer systems, and networks. For example, communication system 1518 may allow computing device 1500 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1518 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 1518 may provide components configured for wired communication (e.g., Ethernet) in addition to or instead of components configured for wireless communication.

Storage system 1520 handles the storage and management of data for computing device 1500. Storage system 1520 may be implemented by one or more non-transitory machine-readable mediums that are configured to store software (e.g., programs, code modules, data constructs, instructions, etc.) and store data used for, or generated during, the execution of the software.

In this example, storage system 1520 includes operating system 1522, one or more applications 1524, I/O module 1526, and communication module 1528. Operating system 1522 includes various procedures, sets of instructions, software components and/or drivers for controlling and managing general system tasks (e.g., memory management, storage device control, power management, etc.) and facilitates communication between various hardware and software components. Operating system 1522 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 1524 can include any number of different applications installed on computing device 1500. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 1526 manages information received via input components (e.g., display 1510, sensors 1512, and microphone 1516) and information to be outputted via output components (e.g., display 1510 and speaker 1514). Communication module 1528 facilitates communication with other devices via communication system 1518 and includes various software components for handling data received from communication system 1518.

One of ordinary skill in the art will realize that the architecture shown in FIG. 15 is only an example architecture of computing device 1500, and that computing device 1500 may have additional or fewer components than shown, or a different configuration of components. The various components shown in FIG. 15 may be implemented in hardware, software, firmware or any combination thereof, including one or more signal processing and/or application specific integrated circuits.

Figure 16:
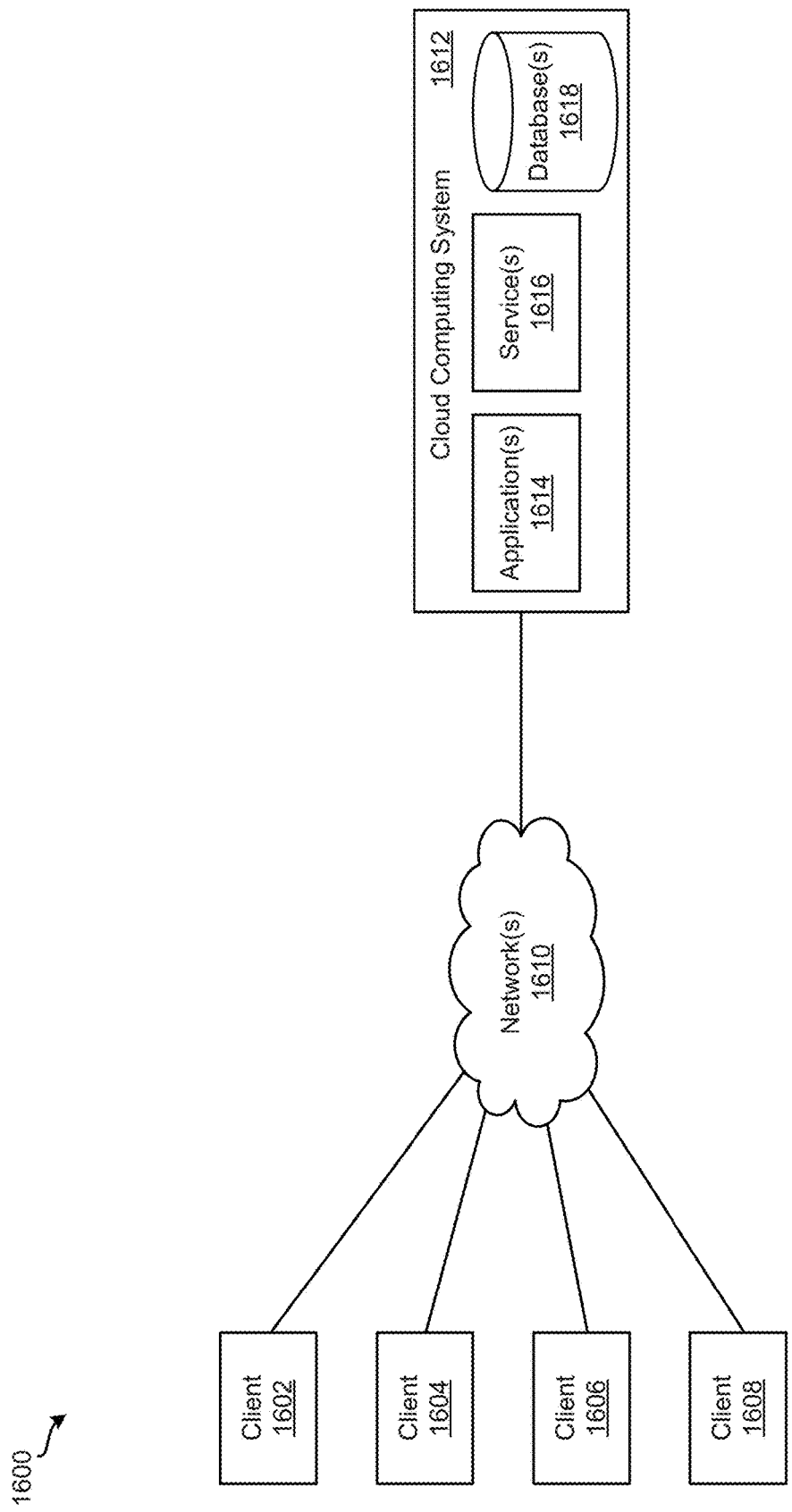
FIG. 16 illustrates a system for implementing various embodiments described above.

FIG. 16 illustrates system 1600 for implementing various embodiments described above. For example, applications 1614 and/or services 1616 of system 1600 may be used to implement master data manager 115 and/or supplier network manager 150. As shown, system 1600 includes client devices 1602-1608, one or more networks 1610, and cloud computing system 1612. Cloud computing system 1612 is configured to provide resources and data to client devices 1602-1608 via networks 1610. In some embodiments, cloud computing system 1600 provides resources to any number of different users (e.g., customers, tenants, organizations, etc.). Cloud computing system 1612 may be implemented by one or more computer systems (e.g., servers), virtual machines operating on a computer system, or a combination thereof.

As shown, cloud computing system 1612 includes one or more applications 1614, one or more services 1616, and one or more databases 1618. Cloud computing system 1600 may provide applications 1614, services 1616, and databases 1618 to any number of different customers in a self-service, subscription-based, elastically scalable, reliable, highly available, and secure manner.

In some embodiments, cloud computing system 1600 may be adapted to automatically provision, manage, and track a customer's subscriptions to services offered by cloud computing system 1600. Cloud computing system 1600 may provide cloud services via different deployment models. For example, cloud services may be provided under a public cloud model in which cloud computing system 1600 is owned by an organization selling cloud services and the cloud services are made available to the general public or different industry enterprises. As another example, cloud services may be provided under a private cloud model in which cloud computing system 1600 is operated solely for a single organization and may provide cloud services for one or more entities within the organization. The cloud services may also be provided under a community cloud model in which cloud computing system 1600 and the cloud services provided by cloud computing system 1600 are shared by several organizations in a related community. The cloud services may also be provided under a hybrid cloud model, which is a combination of two or more of the aforementioned different models.

In some instances, any one of applications 1614, services 1616, and databases 1618 made available to client devices 1602-1608 via networks 1610 from cloud computing system 1600 is referred to as a "cloud service." Typically, servers and systems that make up cloud computing system 1600 are different from the on-premises servers and systems of a customer. For example, cloud computing system 1600 may host an application and a user of one of client devices 1602-1608 may order and use the application via networks 1610.

Applications 1614 may include software applications that are configured to execute on cloud computing system 1612 (e.g., a computer system or a virtual machine operating on a computer system) and be accessed, controlled, managed, etc. via client devices 1602-1608. In some embodiments, applications 1614 may include server applications and/or mid-tier applications (e.g., HTTP (hypertext transport protocol) server applications, FTP (file transfer protocol) server applications, CGI (common gateway interface) server applications, JAVA server applications, etc.) Services 1616 are software components, modules, application, etc. that are configured to execute on cloud computing system 1612 and provide functionalities to client devices 1602-1608 via networks 1610. Services 1616 may be web-based services or on-demand cloud services.

Databases 1618 are configured to store and/or manage data that is accessed by applications 1614, services 1616, and/or client devices 1602-1608. For instance, master data copies storages 120*a-n*, modification rules storage 135, supplier matrices storage 170, category hierarchies storage 175, location hierarchies storage 180, and/or question sets storage 185 may be stored in databases 1618. Databases 1618 may reside on a non-transitory storage medium local to (and/or resident in) cloud computing system 1612, in a storage-area network (SAN), on a non-transitory storage medium local located remotely from cloud computing system 1612. In some embodiments, databases 1618 may include relational databases that are managed by a relational database management system (RDBMS). Databases 1618 may be a column-oriented databases, row-oriented databases, or a combination thereof. In some embodiments, some or all of databases 1618 are in-memory databases. That is, in some such embodiments, data for databases 1618 are stored and managed in memory (e.g., random access memory (RAM)).

Client devices 1602-1608 are configured to execute and operate a client application (e.g., a web browser, a proprietary client application, etc.) that communicates with applications 1614, services 1616, and/or databases 1618 via networks 1610. This way, client devices 1602-1608 may access the various functionalities provided by applications 1614, services 1616, and databases 1618 while applications 1614, services 1616, and databases 1618 are operating (e.g., hosted) on cloud computing system 1600. Client devices 1602-1608 may be computer system 1000 or computing device 1100, as described above by reference to FIGS. 14 and 15, respectively. Although system 1600 is shown with four client devices, any number of client devices may be supported.

Networks 1610 may be any type of network configured to facilitate data communications among client devices 1602-1608 and cloud computing system 1612 using any of a variety of network protocols. Networks 1610 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
   receiving, from a first system, a copy of master data, the master data comprising data associated with a plurality of suppliers, wherein the master data is managed by the first system;
   receiving a master data modification rule comprising a supplier identifier associated with a supplier in the plurality of suppliers, a mapping between a first field of data in the master data and a second field of data in a second system, and a set of validation operations to perform in response to requests to modify the second field;
   receiving, from the second system, a first request to modify a value of the second field of the data in the second system with a new value;
   in response to the first request, identifying the master data modification rule;
   performing the set of validation operations specified in the master data modification rule;
   based on the performance of the set of validation operations:
   modifying the first field in the copy of the master data with the new value based on the supplier identifier; and
   sending a second request to the first system to modify the first field in the master data managed by the first system.

2. The non-transitory machine-readable medium of claim 1, wherein the set of validation operations comprises sending a third request to a user of the first system for approval to modify the first field of data in the master data with the new value, wherein the program further comprises a set of instructions for receiving approval from the user of the first system in response to the third request.

3. The non-transitory machine-readable medium of claim 1, wherein the set of validation operations comprises sending a third request to a third system to validate the new value, wherein the program further comprises a set of instructions for receiving a response from the third system indicating the new value is valid.

4. The non-transitory machine-readable medium of claim 1, wherein the master data is a first master data, wherein the plurality of suppliers is a first plurality of suppliers, wherein the master data modification rule is a first master data modification rule, wherein the supplier identifier is a first supplier identifier, wherein the mapping is a first mapping, wherein the set of validation operations is a first set of validation operations, wherein the program further comprises sets of instructions for:
   receiving, from a third system, a copy of a second master data, the second master data comprising data associated with a second plurality of suppliers, wherein the second master data is managed by the third system; and
   receiving a second master data modification rule comprising a second supplier identifier associated with a supplier in the second plurality of suppliers, a second mapping between a third field of data in the master data and a fourth field of data in the second system, and a second set of validation operations to perform in response to requests to modify the fourth field.

5. The non-transitory machine-readable medium of claim 4, wherein the new value is a first new value, wherein the program further comprises sets of instructions for:
   in response to the first request, identifying the second master data modification rule;
   performing the second set of validation operations specified in the second master data modification rule;
   based on the performance of the second set of validation operations:
   modifying the third field in the copy of the second master data with the second new value based on the second supplier identifier; and
   sending a fourth request to the second system to modify the third field in the second master data managed by the second system.

6. The non-transitory machine-readable medium of claim 4, wherein the new value is a first new value, wherein the program further comprises sets of instructions for:
   receiving, from the second system, a third request to modify a value of the fourth field of the data in the second system with a second new value;
   in response to the third request, identifying the second master data modification rule;
   performing the second set of validation operations specified in the second master data modification rule;
   based on the performance of the second set of validation operations:
   modifying the third field in the copy of the second master data with the second new value based on the second supplier identifier; and
   sending a fourth request to the second system to modify the third field in the second master data managed by the second system.

7. The non-transitory machine-readable medium of claim 1, wherein the program further comprises a set of instructions for sending a notification to the second system that the modification has been applied to the first field of the master data so that the second system can apply the modification to the second field of data in the second system.

8. A method comprising:
   receiving, from a first system, a copy of master data, the master data comprising data associated with a plurality of suppliers, wherein the master data is managed by the first system;
   receiving a master data modification rule comprising a supplier identifier associated with a supplier in the plurality of suppliers, a mapping between a first field of data in the master data and a second field of data in a second system, and a set of validation operations to perform in response to requests to modify the second field;
   receiving, from the second system, a first request to modify a value of the second field of the data in the second system with a new value;
   in response to the first request, identifying the master data modification rule;
   performing the set of validation operations specified in the master data modification rule;
   based on the performance of the set of validation operations:
   modifying the first field in the copy of the master data with the new value based on the supplier identifier; and
   sending a second request to the first system to modify the first field in the master data managed by the first system.

9. The method of claim 8, wherein the set of validation operations comprises sending a third request to a user of the first system for approval to modify the first field of data in the master data with the new value, wherein the method further comprises receiving approval from the user of the first system in response to the third request.

10. The method of claim 8, wherein the set of validation operations comprises sending a third request to a third system to validate the new value, wherein the method further comprises receiving a response from the third system indicating the new value is valid.

11. The method of claim 8, wherein the master data is a first master data, wherein the plurality of suppliers is a first plurality of suppliers, wherein the master data modification rule is a first master data modification rule, wherein the supplier identifier is a first supplier identifier, wherein the mapping is a first mapping, wherein the set of validation operations is a first set of validation operations, wherein the method further comprises:
receiving, from a third system, a copy of a second master data, the second master data comprising data associated with a second plurality of suppliers, wherein the second master data is managed by the third system; and
receiving a second master data modification rule comprising a second supplier identifier associated with a supplier in the second plurality of suppliers, a second mapping between a third field of data in the master data and a fourth field of data in the second system, and a second set of validation operations to perform in response to requests to modify the fourth field.

12. The method of claim 11, wherein the new value is a first new value, wherein the method further comprises:
in response to the first request, identifying the second master data modification rule;
performing the second set of validation operations specified in the second master data modification rule;
based on the performance of the second set of validation operations:
modifying the third field in the copy of the second master data with the second new value based on the second supplier identifier; and
sending a fourth request to the second system to modify the third field in the second master data managed by the second system.

13. The method of claim 11, wherein the new value is a first new value, wherein the method further comprises:
receiving, from the second system, a third request to modify a value of the fourth field of the data in the second system with a second new value;
in response to the third request, identifying the second master data modification rule;
performing the second set of validation operations specified in the second master data modification rule;
based on the performance of the second set of validation operations:
modifying the third field in the copy of the second master data with the second new value based on the second supplier identifier; and
sending a fourth request to the second system to modify the third field in the second master data managed by the second system.

14. The method of claim 8, wherein the method further comprises sending a notification to the second system that the modification has been applied to the first field of the master data so that the second system can apply the modification to the second field of data in the second system.

15. A system comprising:
a set of processing units; and
a non-transitory computer-readable medium storing instructions that when executed by at least one processing unit in the set of processing units cause the at least one processing unit to:

receive, from a first system, a copy of master data, the master data comprising data associated with a plurality of suppliers, wherein the master data is managed by the first system;
receive a master data modification rule comprising a supplier identifier associated with a supplier in the plurality of suppliers, a mapping between a first field of data in the master data and a second field of data in a second system, and a set of validation operations to perform in response to requests to modify the second field;
receive, from the second system, a first request to modify a value of the second field of the data in the second system with a new value;
in response to the first request, identify the master data modification rule;
perform the set of validation operations specified in the master data modification rule;
based on the performance of the set of validation operations:
modify the first field in the copy of the master data with the new value based on the supplier identifier; and
send a second request to the first system to modify the first field in the master data managed by the first system.

16. The system of claim 15, wherein the set of validation operations comprises sending a third request to a user of the first system for approval to modify the first field of data in the master data with the new value, wherein the instructions further cause the at least one processing unit to receive approval from the user of the first system in response to the third request.

17. The system of claim 15, wherein the set of validation operations comprises sending a third request to a third system to validate the new value, wherein the instructions further cause the at least one processing unit to receive a response from the third system indicating the new value is valid.

18. The system of claim 15, wherein the master data is a first master data, wherein the plurality of suppliers is a first plurality of suppliers, wherein the master data modification rule is a first master data modification rule, wherein the supplier identifier is a first supplier identifier, wherein the mapping is a first mapping, wherein the set of validation operations is a first set of validation operations, wherein the instructions further cause the at least one processing unit to:
receive, from a third system, a copy of a second master data, the second master data comprising data associated with a second plurality of suppliers, wherein the second master data is managed by the third system; and
receive a second master data modification rule comprising a second supplier identifier associated with a supplier in the second plurality of suppliers, a second mapping between a third field of data in the master data and a fourth field of data in the second system, and a second set of validation operations to perform in response to requests to modify the fourth field.

19. The system of claim 18, wherein the new value is a first new value, wherein the instructions further cause the at least one processing unit to:
in response to the first request, identify the second master data modification rule;
perform the second set of validation operations specified in the second master data modification rule;

based on the performance of the second set of validation operations:
modify the third field in the copy of the second master data with the second new value based on the second supplier identifier; and
send a fourth request to the second system to modify the third field in the second master data managed by the second system.

20. The system of claim 18, wherein the new value is a first new value, wherein the instructions further cause the at least one processing unit to:
receive, from the second system, a third request to modify a value of the fourth field of the data in the second system with a second new value;
in response to the third request, identify the second master data modification rule;
perform the second set of validation operations specified in the second master data modification rule;
based on the performance of the second set of validation operations:
modify the third field in the copy of the second master data with the second new value based on the second supplier identifier; and
send a fourth request to the second system to modify the third field in the second master data managed by the second system.

* * * * *